United States Patent
Ahlfeld et al.

(10) Patent No.: US 9,159,459 B2
(45) Date of Patent: Oct. 13, 2015

(54) HEAT PIPE NUCLEAR FISSION DEFLAGRATION WAVE REACTOR COOLING

(75) Inventors: Charles E. Ahlfeld, LaJolla, CA (US); John Rogers Gilleland, Kirkland, WA (US); Roderick A. Hyde, Redmond, WA (US); Muriel Y. Ishikawa, Livermore, CA (US); David G. McAlees, Bellevue, WA (US); Nathan P. Myhrvold, Medina, WA (US); Thomas Allan Weaver, San Mateo, CA (US); Charles Whitmer, North Bend, WA (US); Lowell L. Wood, Jr., Bellevue, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 1919 days.

(21) Appl. No.: 12/286,548

(22) Filed: Sep. 29, 2008

(65) Prior Publication Data
US 2010/0040188 A1    Feb. 18, 2010

Related U.S. Application Data

(63) Continuation-in-part of application No. 12/228,542, filed on Aug. 12, 2008, now abandoned.

(51) Int. Cl.
| | | |
|---|---|---|
| G21C 15/00 | (2006.01) | |
| G21C 1/00 | (2006.01) | |
| G21C 1/02 | (2006.01) | |
| G21D 1/00 | (2006.01) | |
| G21C 3/00 | (2006.01) | |

(52) U.S. Cl.
CPC ...... *G21C 1/00* (2013.01); *G21C 1/026* (2013.01); *G21D 1/00* (2013.01); *G21C 3/00* (2013.01); *G21C 15/00* (2013.01); *Y02E 30/34* (2013.01)

(58) Field of Classification Search
USPC .................................. 376/367, 361, 277, 347
See application file for complete search history.

(56) References Cited

U.S. PATENT DOCUMENTS

| | | |
|---|---|---|
| 4,478,784 A | 10/1984 | Burelbach |
| 4,560,533 A | 12/1985 | Huebotter et al. |
| 4,851,183 A * | 7/1989 | Hampel ........................ 376/274 |

(Continued)

FOREIGN PATENT DOCUMENTS

| | | |
|---|---|---|
| WO | WO 2009/136971 A2 | 11/2009 |
| WO | WO 2009/139899 A1 | 11/2009 |

OTHER PUBLICATIONS

Sekimoto et al.; "Startup of 'Candle' burnup in fast reactor from enriched uranium core"; Energy Conversation & Management; bearing a date of May 22, 2006; pp. 2772-2780; vol. 47; Elsevier Ltd.*

(Continued)

*Primary Examiner* — Jack W Keith
*Assistant Examiner* — Marshall O'Connor

(57) ABSTRACT

Illustrative embodiments provide systems, applications, apparatuses, and methods related to nuclear fission deflagration wave reactor cooling. Illustrative embodiments and aspects include, without limitation, nuclear fission deflagration wave reactors, methods of transferring heat of a nuclear fission deflagration wave reactor, methods of transferring heat from a nuclear fission deflagration wave reactor, methods of transferring heat within a nuclear fission deflagration wave reactor, and the like.

11 Claims, 38 Drawing Sheets

(56) References Cited

U.S. PATENT DOCUMENTS

| | | | |
|---|---|---|---|
| 5,264,056 A | | 11/1993 | Lapides |
| 5,684,848 A | * | 11/1997 | Gou et al. .................... 376/367 |
| 5,774,514 A | | 6/1998 | Rubbia |
| 6,353,651 B1 | | 3/2002 | Gou et al. |
| 6,684,848 B2 | | 2/2004 | Saito et al. |
| 6,718,001 B2 | | 4/2004 | Hidaka et al. |
| 6,768,781 B1 | | 7/2004 | Moriarty |
| 6,810,099 B2 | | 10/2004 | Nakamaru et al. |
| 6,810,946 B2 | | 11/2004 | Hoang |
| 6,876,714 B2 | | 4/2005 | Rubbia |
| 6,888,910 B1 | | 5/2005 | Moriarty |
| 2004/0062340 A1 | * | 4/2004 | Peterson .................... 376/383 |
| 2004/0182088 A1 | | 9/2004 | Ghoshal et al. |
| 2005/0069075 A1 | | 3/2005 | D'Auvergne |
| 2008/0069289 A1 | * | 3/2008 | Peterson .................... 376/243 |
| 2008/0123796 A1 | | 5/2008 | Hyde et al. |

OTHER PUBLICATIONS

PCT International Search Report; International App. No. PCT/US2009/04512; Dec. 7, 2009; pp. 1-2.

U.S. Appl. No. 12/152,904, Ahlfeld et al.

U.S. Appl. No. 12/069,908, Ahlfeld et al.

U.S. Appl. No. 11/605,943, Hyde et al.

U.S. Appl. No. 11/605,933, Hyde et al.

U.S. Appl. No. 11/605,848, Hyde et al.

Hyde, Roderick; Ishikawa, Muriel; Myhrvold, Nathan; Nuckolls, John; Wood, Lowell; "Nuclear Fission Power for 21$^{st}$ Century Needs: Enabling Technologies for Large-Scale, Low-Risk, Affordable Nuclear Electricity" [Abstract]; p. 1.

Teller, Edward; Ishikawa, Muriel; Wood, Lowell; "Completely Automated Nuclear Reactors for Long-Term Operation"; "Frontiers in Physics Symposium"; bearing dates of Oct. 26-28, 1995 and Jan. 1996; pp. 1-13; Lawrence Livermore National Laboratory; Livermore, California.

Teller, Edward; Ishikawa, Muriel; Wood, Lowell; Hyde, Roderick; Nuckolls, John; "Completely Automated Nuclear Power Reactors for Long-Term Operation: III. Enabling Technology for Large-Scale, Low-Risk, Affordable Nuclear Electricity"; presented at the Jul. 2003 Workshop of the Aspen Global Change Institute; pp. 1-57; University of California Lawrence Livermore National Laboratory; Livermore, California.

Teller, Edward; Ishikawa, Muriel; Wood, Lowell; Hyde, Roderick; Nuckolls, John; "Completely Automated Nuclear Reactors for Long-Term Operation II: Toward a Concept-Level Point-Design of a High-Temperature, Gas-Cooled Central Power Station System"; 1996 International Conference on Emerging Nuclear Energy Systems; bearing dates of Jun. 20, 1996 and Jun. 24-28, 1996; pp. 1-44; Lawrence Livermore National Laboratory; Livermore, California.

Teller, Edward; Wood, Lowell; Nuckolls, John; Ishikawa, Muriel; Hyde, Roderick; "Problem-Free Nuclear Power and Global Change"; 22$^{nd}$ International Symposium on Planetary Emergencies; bearing dates of Aug. 15, 1997 and Aug. 20-23, 1997; pp. 1-10; Lawrence Livermore National Laboratory; Livermore, California.

Wood, Lowell; Hyde, Rod; Ishikawa, Muriel; "Novel Approaches to Nuclear Fission Power Generation: A Practical, *Manifestly* Safe Point-Design for World-Wide Civil Use in the 21$^{st}$ Century"; LLNL P&AT/CGSR ad hoc session; bearing a date of Apr. 25, 2001; pp. 1-15.

Wood, Lowell; Ishikawa, Muriel; Hyde, Roderick; "Global Warming and Nuclear Power"; Innovative Energy Systems and CO2 Stabilization; bearing dates of Jul. 10, 1998 and Jul. 14-24, 1998; pp. 1-22; Lawrence Livermore National Laboratory; Livermore, California.

Chinese Patent Office; First Office Action; App. No. 2007/80049941. 2; Jan. 29, 2012; pp. 1-6; no translation available.

(Author unknown); "CEFR"; bearing a date of Oct. 1, 1998; pp. 1-1 through 1-8; no translation available.

European Patent Office; European Search Report; Application No. EP 09 80 6943; Dec. 21, 2012; pp. 1-3.

European Patent Office; European Search Report; Application No. EP 07 87 3851; Dec. 21, 2012; pp. 1-4.

Ohoka et al.; "Simulation Study on CANDLE Burnup Applied to Block-Type High Temperature Gas Cooled Reactor"; Progress in Nuclear Energy; bearing a date of 2005; pp. 292-299; vol. 47, No. 1-4; Elsevier Ltd; Great Britain.

Teller, Edward.; "Nuclear Energy for the Third Millennium"; International Conference on Environment and Nuclear Energy; Oct. 27-29, 1997; bearing a date of Oct. 1997; pp. 1-14; Lawrence Livermore National Laboratory; Livermore, CA.

* cited by examiner

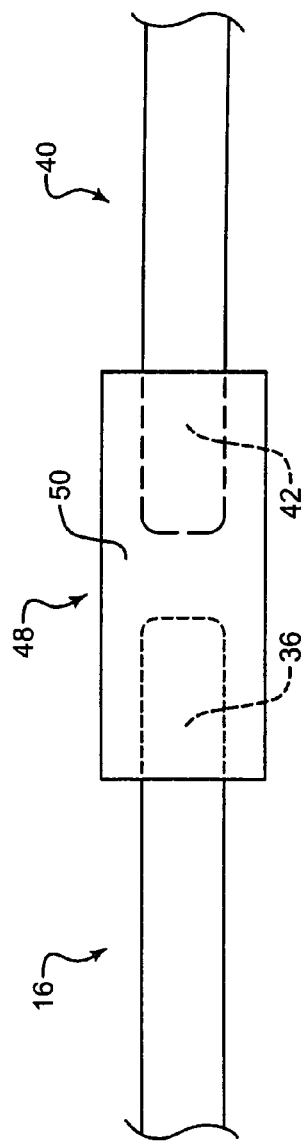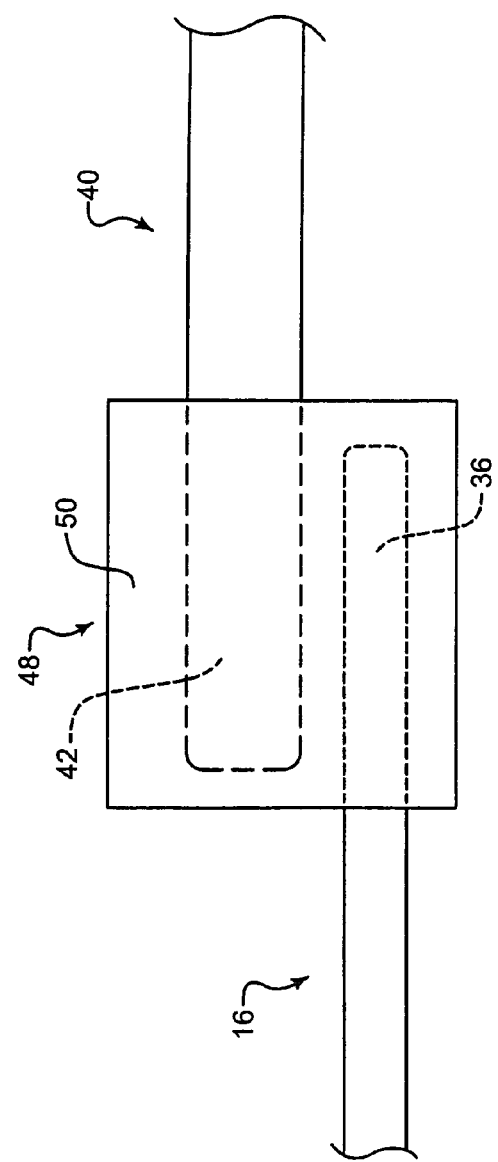

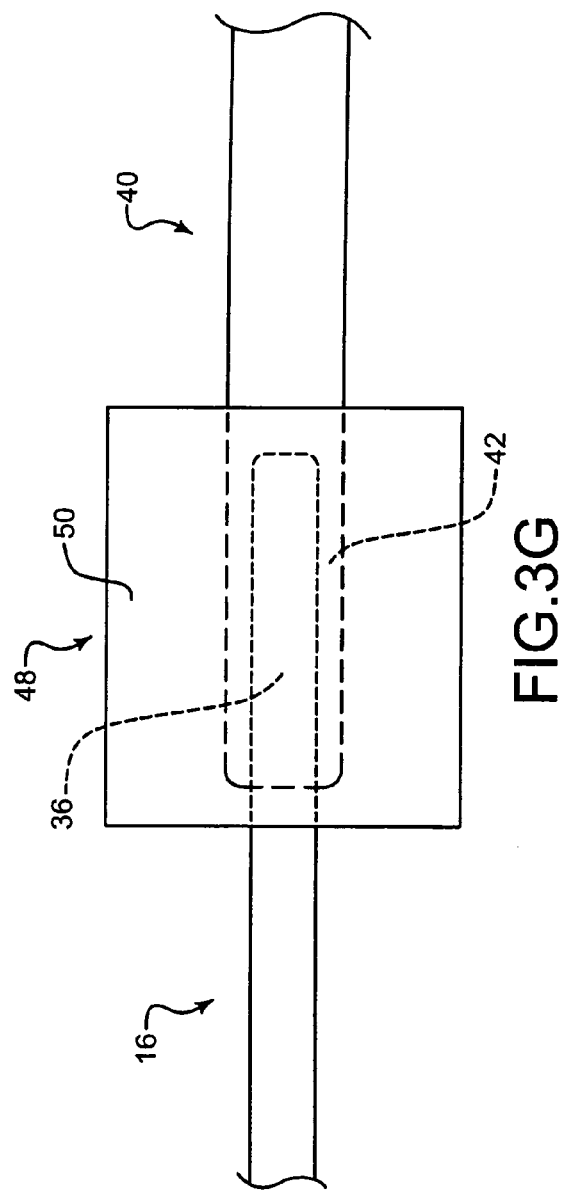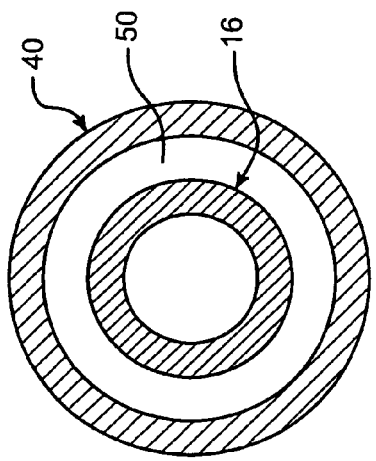

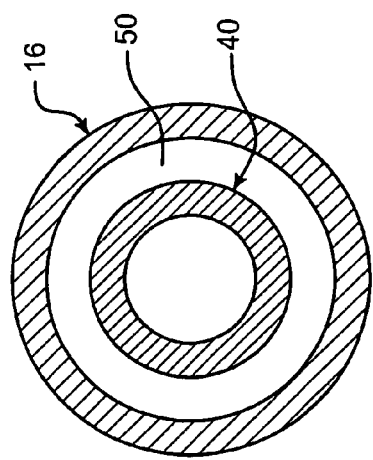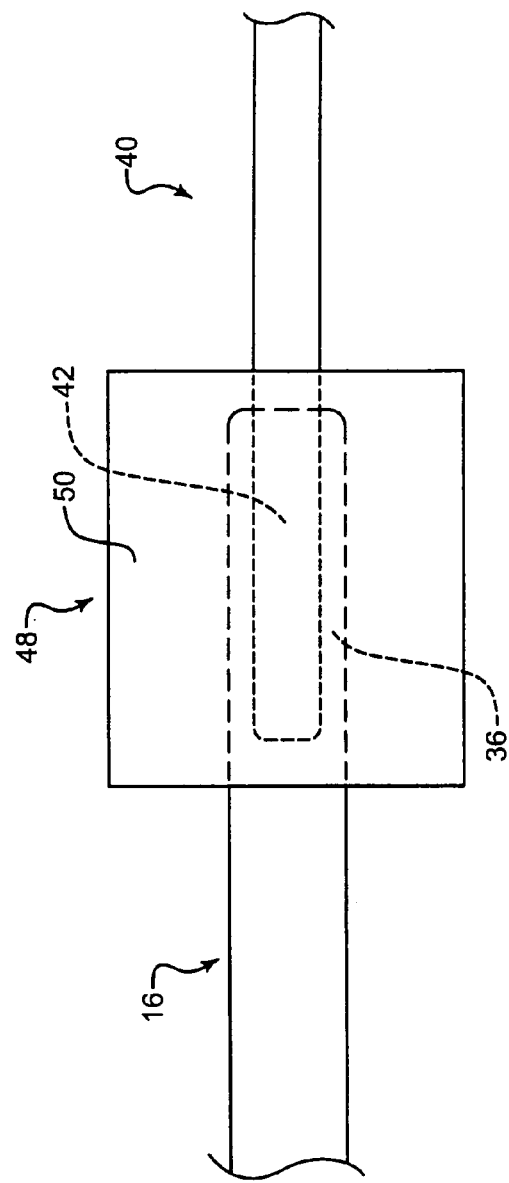

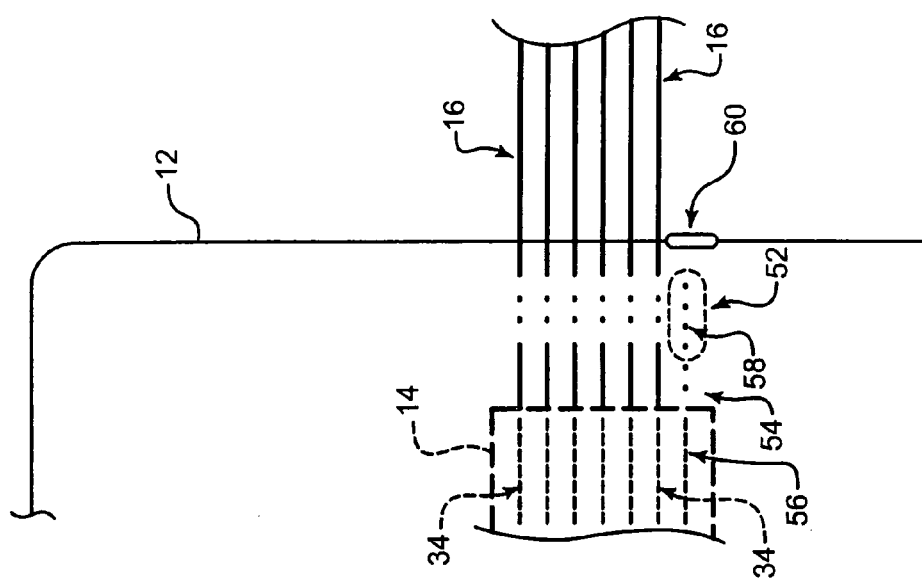

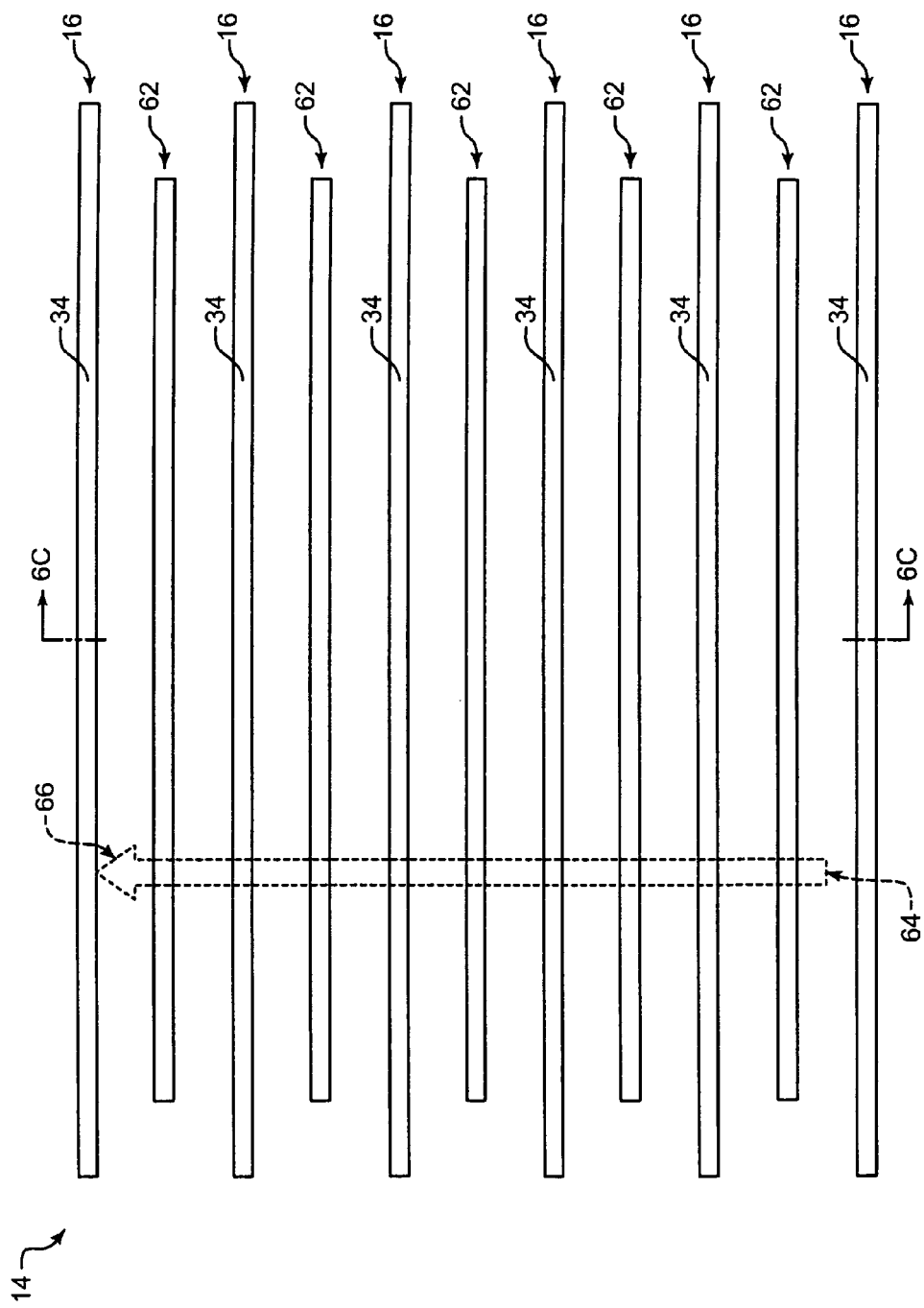

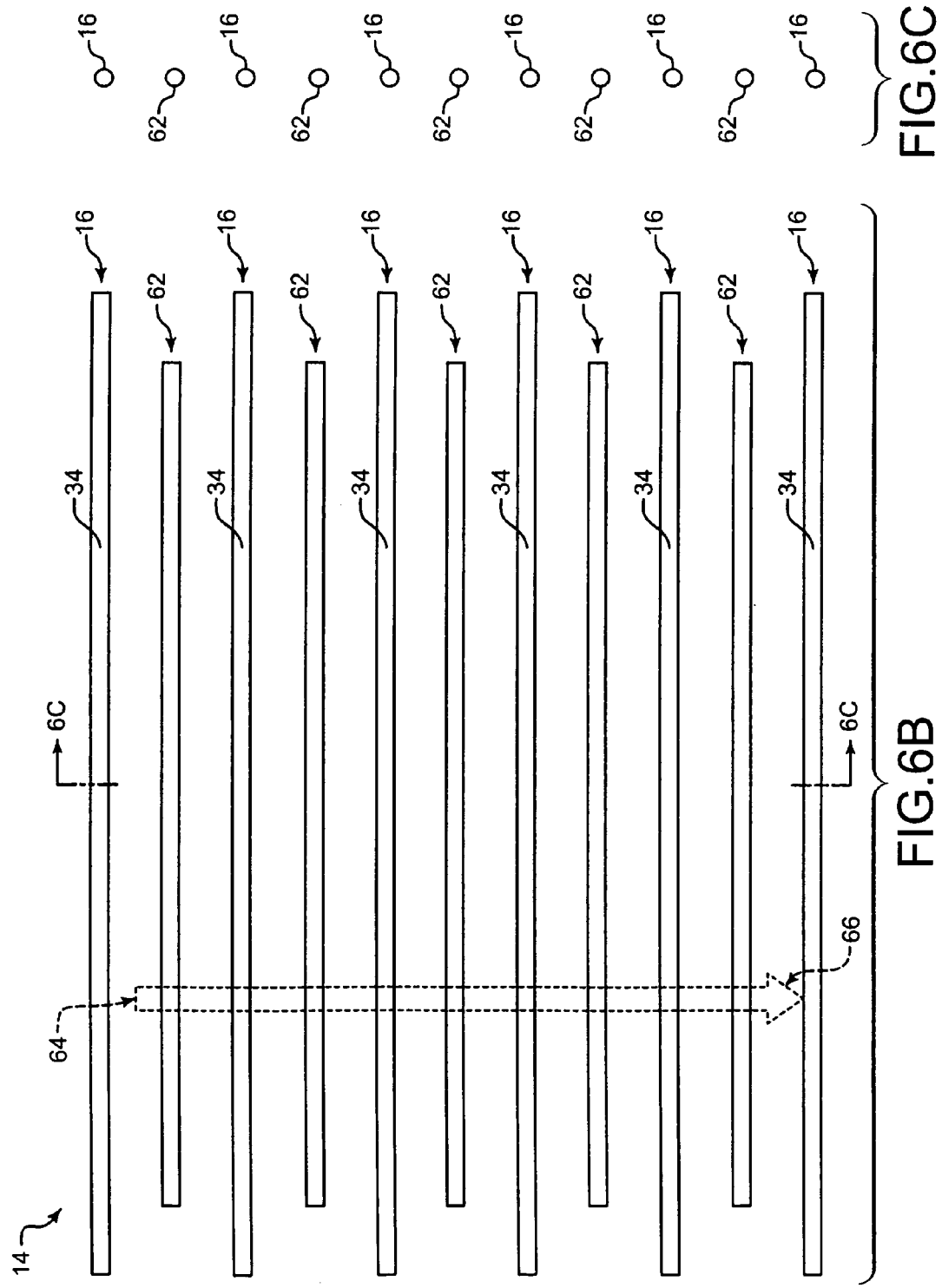

HEAT PIPE NUCLEAR FISSION DEFLAGRATION WAVE REACTOR COOLING

For the purposes of the USPTO extra-statutory requirements, the present application constitutes a continuation-in-part of U.S. patent application Ser. No. 12/228,542, entitled HEAT PIPE NUCLEAR FISSION DEFLAGRATION WAVE REACTOR COOLING, naming Charles E. Ahlfeld, John Rogers Gilleland, Roderick A. Hyde, Muriel Y. Ishikawa, David G. McAlees, Nathan P. Myhrvold, Thomas Allan Weaver, Charles Whitmer and Lowell L. Wood, Jr. as inventors, filed 12 Aug. 2008, now abandoned which is currently co-pending, or is an application of which a currently co-pending application is entitled to the benefit of a filing date.

BACKGROUND

The present application relates to nuclear fission deflagration wave reactor cooling, and systems, applications, apparatuses, and methods related thereto.

SUMMARY

Illustrative embodiments provide systems, applications, apparatuses, and methods related to nuclear fission deflagration wave reactor cooling. Illustrative embodiments and aspects include, without limitation, nuclear fission deflagration wave reactors, methods of transferring heat of a nuclear fission deflagration wave reactor, methods of transferring heat from a nuclear fission deflagration wave reactor, methods of transferring heat within a nuclear fission deflagration wave reactor, and the like.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 3E is a schematic illustration of an illustrative detail of the nuclear fission deflagration wave reactors of FIGS. 3A through 3D.

FIG. 3F is a schematic illustration of another illustrative detail of the nuclear fission deflagration wave reactors of FIGS. 3A through 3D.

FIG. 3G is a schematic illustration of another illustrative detail of the nuclear fission deflagration wave reactors of FIGS. 3A through 3D.

FIG. 3H is a cross-section end view in partial schematic form of a portion of the detail of FIG. 3G.

FIG. 3I is a schematic illustration of another illustrative detail of the nuclear fission deflagration wave reactors of FIGS. 3A through 3D.

FIG. 3J is a cross-section end view in partial schematic form of a portion of the detail of FIG. 3I.

FIG. 4 is a schematic illustration of a portion of another illustrative nuclear fission deflagration wave reactor.

FIG. 6A is a top plan view in partial schematic form of a portion of another illustrative nuclear fission deflagration wave reactor core assembly.

FIG. 6B is a top plan view in partial schematic form of a portion of another illustrative nuclear fission deflagration wave reactor core assembly.

FIG. 6C is an end plan view in partial schematic form taken along line A-A of FIGS. 6A and 6B.

DETAILED DESCRIPTION

Figure 1A:
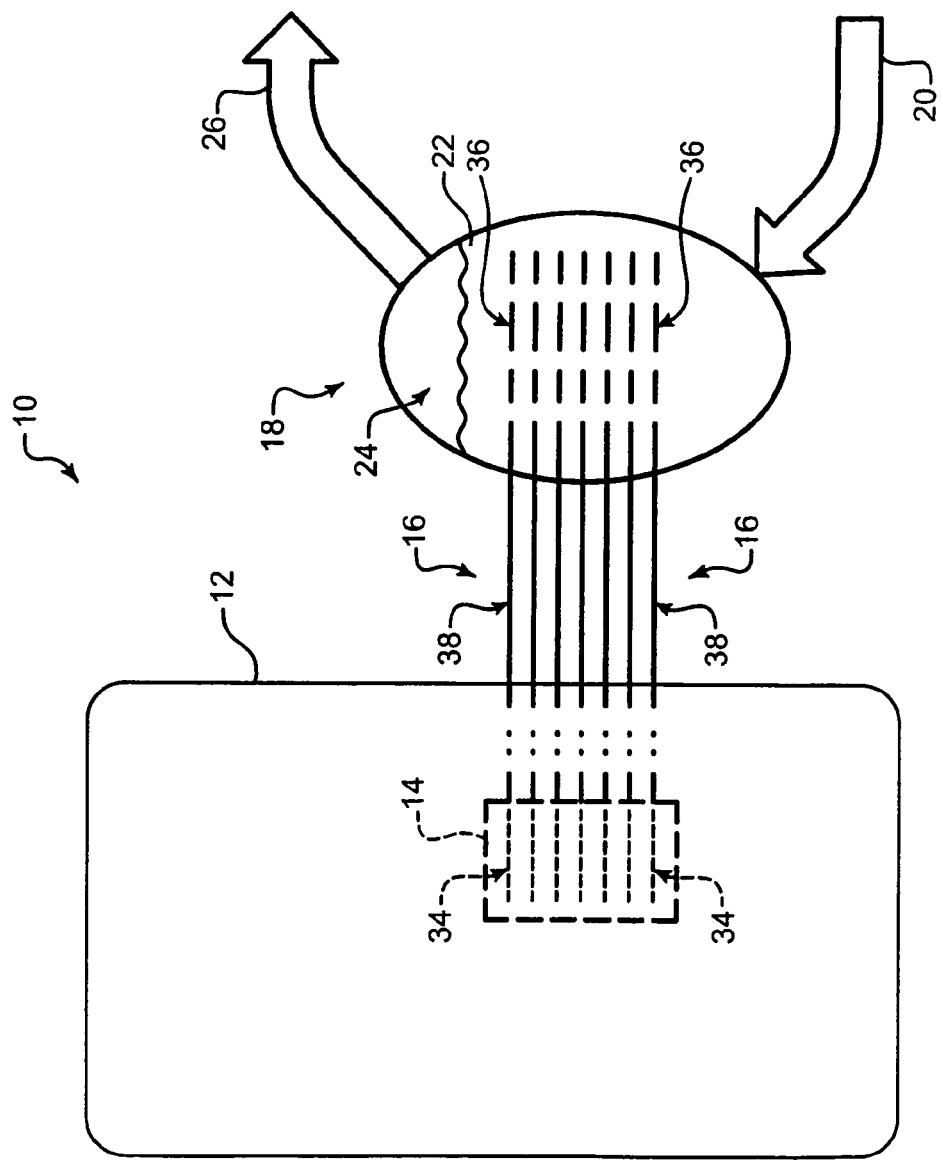
FIG. 1A is a schematic illustration of an illustrative nuclear fission deflagration wave reactor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Overview

By way of overview, illustrative embodiments provide systems, applications, apparatuses, and methods related to nuclear fission deflagration wave reactor cooling. Illustrative embodiments and aspects include, without limitation, nuclear fission deflagration wave reactors, methods of transferring heat of a nuclear fission deflagration wave reactor, methods of transferring heat from a nuclear fission deflagration wave reactor, methods of transferring heat within a nuclear fission deflagration wave reactor, and the like.

Still by way of overview and referring to FIG. 1A, an illustrative nuclear fission deflagration wave reactor 10 will be discussed by way of illustration and not limitation. The illustrative nuclear fission deflagration wave reactor 10 suitably includes a reactor vessel 12. A reactor core assembly 14 is disposed in the reactor vessel 12 and has nuclear fission fuel material disposed therein. At least one primary heat pipe 16 is disposed in thermal communication with the nuclear fission fuel material. Illustrative non-limiting embodiments will now be explained.

As a preliminary matter, it will be noted that, for this illustrative example, at least one primary heat pipe 16 is disposed in thermal communication with the nuclear fission fuel material. Thus, in some embodiments, one primary heat pipe 16 may be disposed in thermal communication with the nuclear fission fuel material. Likewise, in some other embodiments, more than one primary heat pipe 16 may be disposed in thermal communication with the nuclear fission fuel material. While the drawings illustrate more than one primary heat pipe 16 included in various embodiments of the nuclear fission deflagration wave reactor 10, such drawings are for illustration purposes only and are not intended to be limiting. To that end, the number of primary heat pipes 16 disposed in thermal communication with the nuclear fission fuel material is not limited in any manner whatsoever. Instead, any number of primary heat pipes 16 may be disposed in thermal communication with the nuclear fission fuel material as desired for a particular application, depending upon without limitation power production requirements, spatial constraints, regulatory restrictions, or the like.

For sake of clarity, references to "at least one primary heat pipe 16" in the description that follows (such as in the context of discussions of various embodiments of the nuclear fission deflagration wave reactor 10) will be made to "the primary heat pipes 16". Nonetheless, it will be appreciated that such references to "the primary heat pipes 16" are made for purposes of clarity and are not intended to limit the number of primary heat pipes 16 to more than one primary heat pipe 16.

In some embodiments at least one heat sink 18 may be disposed in thermal communication with the primary heat pipes. 16. The heat sink 18 may be a steam generator, a biomass reactor, or any other processing device that transfers heat from the primary heat pipes 16, as desired. In the example shown by way of illustration and not limitation when the heat sink 18 is a steam generator, a feedwater inlet 20 supplies feedwater 22 to the heat sink 18. Heat is transferred from the primary heat pipes 16 to the feedwater 22, and the feedwater 22 is transformed in phase from liquid to steam 24. The steam 24 exits the heat sink 18 via a steam outlet 26.

In some embodiments, the heat sink 18 may be an external heat sink. That is, the heat sink 18 may be disposed external to the reactor vessel 12. In some other embodiments described below, an internal heat sink (not shown in FIG. 1A) may be disposed internal to the reactor vessel 12.

Figure 1B:
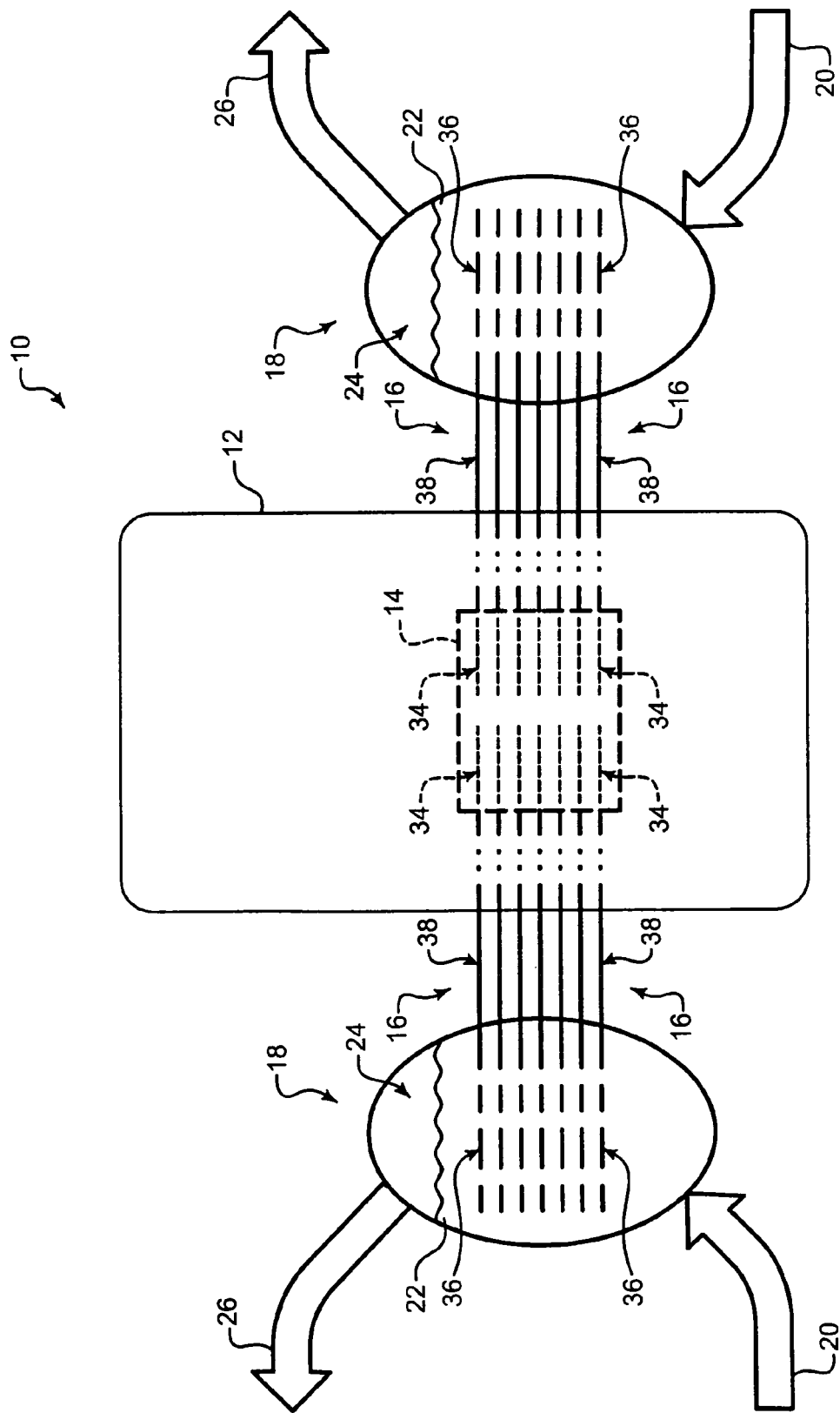
FIG. 1B is a schematic illustration of another illustrative nuclear fission deflagration wave reactor.

It will be appreciated that any number of the heat sinks 18 may be provided as desired for a particular application. For example, as shown in FIG. 1A some embodiments include one heat sink 18. Referring additionally now to FIG. 1B, some embodiments may include two of the heat sinks 18. For sake of brevity, additionally embodiments in which more than two of the heat sinks 18 are not shown. Nonetheless, it will be appreciated that no limit to the number of heat sinks 18 is intended and no limit should be inferred. The number of heat sinks 18 is not limited and any number of the heat sinks 18 may be used as desired for a particular application, depending upon without limitation power production requirements, spatial constraints, regulatory restrictions, or the like. Therefore, for the same clarity reasons as discussed above for the primary heat pipes 16, references will be made to the heat sinks 18 without intention to limit the number of heat sinks 18 to more than one heat sink 18.

An overview now has been set forth for some embodiments of the nuclear fission deflagration reactor 10. Next, considerations and an overview will be given by way of example (and not of limitation) regarding a nuclear fission deflagration wave and the nucleonics thereof. Then, additional illustrative details will be given regarding other embodiments and aspects of nuclear fission deflagration wave reactors.

Considerations Behind Nuclear Fission Deflagration Wave Reactor Embodiments

Before discussing details of the nuclear fission deflagration wave reactor 10, some considerations behind embodiments of the nuclear fission deflagration wave reactor 10 will be given by way of overview but are not to be interpreted as limitations. Some embodiments of the nuclear fission deflagration wave reactor 10 address many of the considerations discussed below. On the other hand, some other embodiments of the nuclear fission deflagration wave reactor 10 may address one, or a select few of these considerations, and need not accommodate all of the considerations discussed below. Portions of the following discussion include information excerpted from a paper entitled "Completely Automated Nuclear Power Reactors For Long-Term Operation: III. Enabling Technology For Large-Scale, Low-Risk, Affordable Nuclear Electricity" by Edward Teller, Muriel Ishikawa, Lowell Wood, Roderick Hyde, and John Nuckolls, presented at the July 2003 Workshop of the Aspen Global Change Institute, University of California Lawrence Livermore National Laboratory publication UCRL-JRNL-122708 (2003) (This paper was prepared for submittal to *Energy, The International Journal*, 30 Nov. 2003), the contents of which are hereby incorporated by reference.

Certain of the nuclear fission fuels envisioned for use in embodiments of the nuclear fission deflagration wave reactor 10 are typically widely available, such as without limitation uranium (natural, depleted, or enriched), thorium, plutonium, or even previously-burned nuclear fission fuel assemblies. Other, less widely available nuclear fission fuels, such as without limitation other actinide elements or isotopes thereof may be used in embodiments of the nuclear fission deflagration wave reactor 10. While some embodiments of the nuclear fission deflagration wave reactor 10 contemplate long-term operation at full power on the order of around ⅓ century to around ½ century or longer, an aspect of some embodiments of the nuclear fission deflagration wave reactor 10 does not contemplate nuclear refueling (but instead contemplate burial in-place at end-of-life) while some aspects of embodiments of the nuclear fission deflagration wave reactor 10 contemplate nuclear refueling—with some nuclear refueling occurring during shutdown and some nuclear refueling occurring during operation at power. It is also contemplated that nuclear fission fuel reprocessing may be avoided in some cases, thereby mitigating possibilities for diversion to military uses and other issues.

Other considerations that may affect choices for some embodiments of nuclear fission deflagration wave reactor 10 include disposing in a safe manner long-lived radioactivity generated in the course of operation. It is envisioned that the nuclear fission deflagration wave reactor 10 may be able to mitigate damage due to operator error, casualties such as a loss of coolant accident (LOCA), or the like. In some aspects decommissioning may be effected in low-risk and inexpensive manner.

For example, some embodiments of the nuclear fission deflagration wave reactor 10 may entail underground siting, thereby addressing large, abrupt releases and small, steady-state releases of radioactivity into the biosphere. Some embodiments of the nuclear fission deflagration wave reactor 10 may entail minimizing operator controls, thereby automating those embodiments as much as practicable. In some embodiments, a life-cycle-oriented design is contemplated, wherein those embodiments of the nuclear fission deflagration wave reactor 10 can operate from startup to shutdown at end-of-life. In some life-cycle oriented designs, the embodiments may operate in a substantially fully-automatic manner. Embodiments of the nuclear fission deflagration wave reactor 10 lend themselves to modularized construction. Finally, some embodiments of the nuclear fission deflagration wave reactor 10 may be designed according to high power density.

Some features of various embodiments of the nuclear fission deflagration wave reactor 10 result from some of the above considerations. For example, simultaneously accommodating desires to achieve ⅓-½ century (or longer) of operations at full power without nuclear refueling and to avoid nuclear fission fuel reprocessing may entail use of a fast neutron spectrum. As another example, in some embodiments a negative temperature coefficient of reactivity ($\alpha_T$) is engineered-in to the nuclear fission deflagration wave reactor 10, such as via negative feedback on local reactivity implemented with strong absorbers of fast neutrons. As a further example, in some embodiments of the nuclear fission deflagration wave reactor 10 a distributed thermostat enables a propagating nuclear fission deflagration wave mode of nuclear fission fuel burn. This mode simultaneously permits a high average burn-up of non-enriched actinide fuels, such as natural uranium or thorium, and use of a comparatively small "nuclear fission igniter" region of moderate isotopic enrichment of nuclear fissionable materials in the core's fuel charge. As another example, in some embodiments of the nuclear fission deflagration wave reactor 10, multiple redundancy is provided in primary and secondary core cooling.

Overview of Illustrative Core Nucleonics

An overview of (i) the reactor core assembly 14 and its nucleonics and (ii) propagation of a nuclear fission deflagration wave now will be set forth.

Given by way of overview and in general terms, structural components of the reactor core assembly 14 may be made of tantalum (Ta), tungsten (W), rhenium (Re), or carbon composite, ceramics, or the like. These materials or similar may be selected to address the high temperatures at which the reactor core assembly 14 typically operates. Alternatively, or additionally, such material selection may be influenced by the materials' creep resistance over the envisioned lifetime of full power operation, mechanical workability, and/or corrosion resistance. Structural components can be made from single materials, or from combinations of materials (e.g., coatings, alloys, multilayers, composites, and the like). In some embodiments, the reactor core assembly 14 operates at sufficiently lower temperatures so that other materials, such as aluminum (Al), steel, titanium (Ti) or the like can be used, alone or in combinations, for structural components.

The reactor core assembly 14 suitably can include a nuclear fission igniter and a larger nuclear fission deflagration burn-wave-propagating region. The nuclear fission deflagration burn-wave-propagating region suitably contains thorium or uranium fuel, and functions on the general principle of fast neutron spectrum fission breeding. In some embodiments, uniform temperature throughout the reactor core assembly 14 is maintained by thermostating modules which regulate local neutron flux and thereby control local power production.

The reactor core assembly 14 suitably is a breeder for reasons of efficient nuclear fission fuel utilization and of minimization of requirements for isotopic enrichment. Further, and referring now to FIGS. 2A and 2B, the reactor core assembly 14 suitably utilizes a fast neutron spectrum because the high absorption cross-section of fission products for thermal neutrons typically does not permit utilization of more than about 1% of thorium or of the more abundant uranium isotope, $^{238}$U, in uranium-fueled embodiments, without removal of fission products.

Figure 2A:
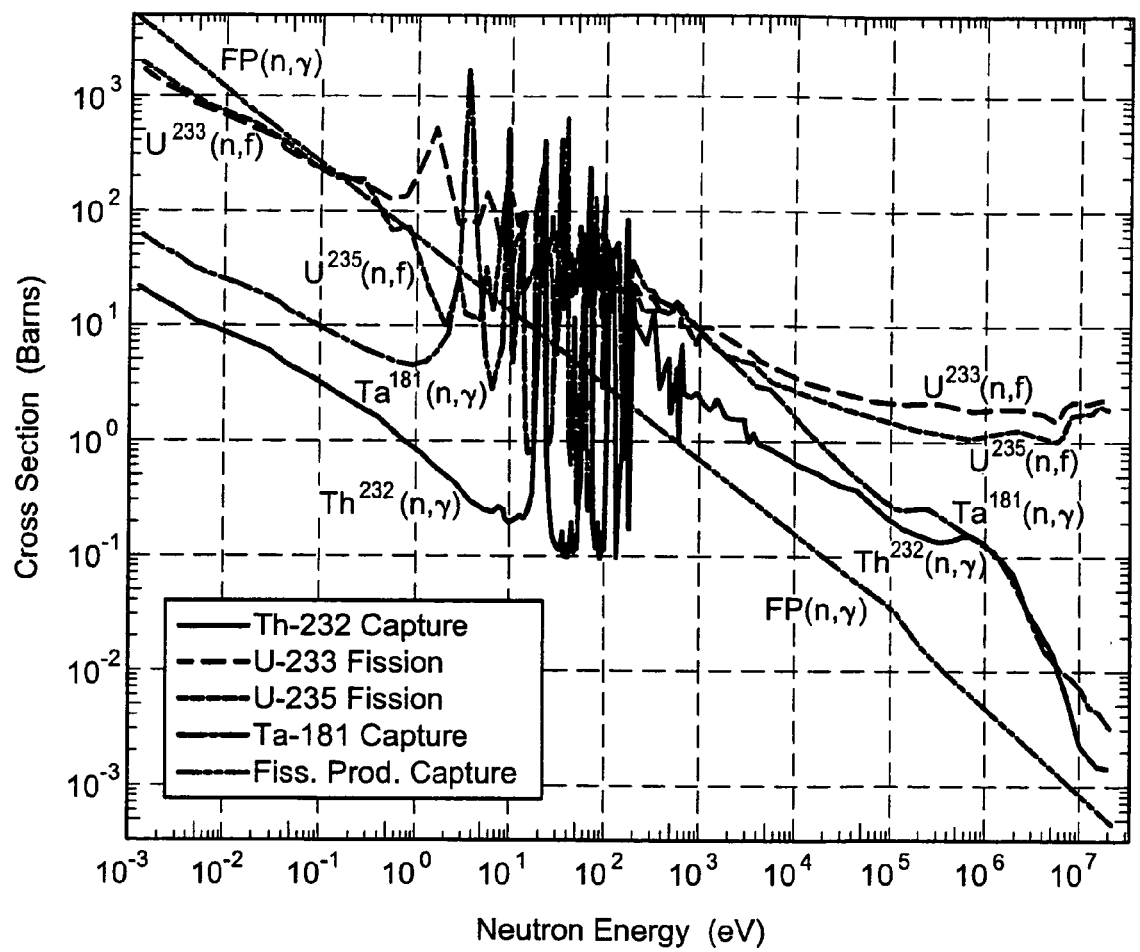
FIGS. 2A and 2B plot cross-section versus neutron energy.

In FIG. 2A, cross-sections for the dominant neutron-driven nuclear reactions of interest for the $^{232}$Th-fueled embodiments are plotted over the neutron energy range $10^{-3}$-$10^7$ eV. It can be seen that losses to radiative capture on fission product nuclei dominate neutron economies at near-thermal (~0.1 eV) energies, but are comparatively negligible above the resonance capture region (between ~3-300 eV). Thus, operating with a fast neutron spectrum when attempting to realize a high-gain fertile-to-fissile breeder can help to preclude fuel recycling (that is, periodic or continuous removal of fission products). The radiative capture cross-sections for fission products shown are those for intermediate-Z nuclei resulting from fast neutron-induced fission that have undergone subsequent beta-decay to negligible extents. Those in the central portions of the burn-waves of embodiments of the reactor core assembly 14 will typically have undergone some decay and thus will have somewhat higher neutron avidity. However, parameter studies have indicated that core fuel-burning results may be insensitive to the precise degree of such decay for some configurations.

Figure 2B:
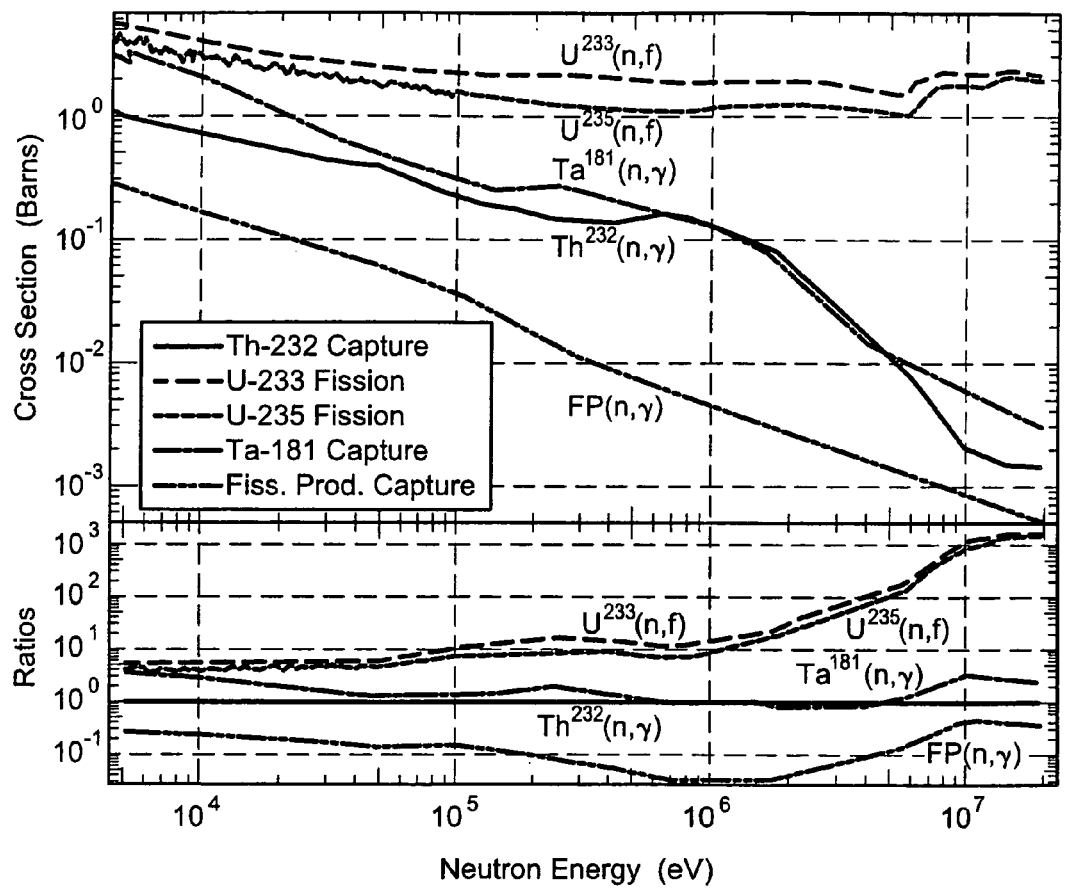

In FIG. 2B, cross-sections for the dominant neutron-driven nuclear reactions of primary interest for the $^{232}$Th-fueled embodiments are plotted over the most interesting portion of the neutron energy range, between >$10^4$ and <$10^{6.5}$ eV, in the upper portion of FIG. 2B. The neutron spectrum of embodiments of the reactor core assembly 14 peaks in the ≥$10^5$ eV neutron energy region. The lower portion of FIG. 2B contains the ratio of these cross-sections vs. neutron energy to the cross-section for neutron radiative capture on $^{232}$Th, the fertile-to-fissile breeding step (as the resulting $^{233}$Th swiftly beta-decays to $^{233}$Pa, which then relatively slowly beta-decays to $^{233}$U, analogously to the $^{239}$U-$^{239}$Np-$^{239}$Pu beta decay-chain upon neutron capture by $^{238}$U).

It can be seen that losses to radiative capture on fission products can be comparatively negligible over the neutron energy range of interest, and furthermore that atom-fractions of a few tens of percent of high-performance structural material, such as Ta, will impose tolerable loads on the neutron economy in the reactor core assembly 14. These data also suggest that core-averaged fuel burn-up in excess of 50% can be realizable, and that fission product-to-fissile atom-ratios behind the nuclear fission deflagration wave when reactivity is finally driven negative by fission-product accumulation will be approximately 10:1.

Origination and Propagation of Nuclear Fission Deflagration Wave Burnfront

An illustrative nuclear fission deflagration wave within the reactor core assembly 14 will now be explained. Propagation of deflagration burning-waves through combustible materials can release power at predictable levels. Moreover, if the material configuration has the requisite time-invariant features, the ensuing power production may be at a steady level. Finally, if deflagration wave propagation-speed may be externally modulated in a practical manner, the energy release-rate and thus power production may be controlled as desired.

Sustained nuclear fission deflagration waves are rare in nature, due to disassembly of initial nuclear fission fuel configuration as a hydrodynamic consequence of energy release during the earliest phases of wave propagation, in the absence of some control.

However, in embodiments of the reactor core assembly 14 a nuclear fission deflagration wave can be initiated and propagated in a sub-sonic manner in fissionable fuel whose pressure is substantially independent of its temperature, so that its hydrodynamics is substantially 'clamped'. The nuclear fission deflagration wave's propagation speed within the reactor core assembly 14 can be controlled in a manner conducive to large-scale power generation, such as in an electricity-producing reactor system like embodiments of the nuclear fission deflagration wave reactor 10.

Nucleonics of the nuclear fission deflagration wave are explained below. Inducing nuclear fission of selected isotopes of the actinide elements—the fissile ones—by capture of neutrons of any energy permits the release of nuclear binding energy at any material temperature, including arbitrarily low ones. The neutrons that are captured by the fissile actinide element may be provided by the nuclear fission igniter.

Release of more than a single neutron per neutron captured, on the average, by nuclear fission of substantially any actinide isotope can provide opportunity for a diverging neutron-mediated nuclear-fission chain reaction in such materials. Release of more than two neutrons for every neutron which is captured (over certain neutron-energy ranges, on the average) by nuclear fission by some actinide isotopes may permit first converting an atom of a non-fissile isotope to a fissile one (via neutron capture and subsequent beta-decay) by an initial neutron capture, and then of neutron-fissioning the nucleus of the newly-created fissile isotope in the course of a second neutron capture.

Most really high-Z (Z≥90) nuclear species can be combusted if, on the average, one neutron from a given nuclear fission event can be radiatively captured on a non-fissile-but-'fertile' nucleus which will then convert (such as via beta-decay) into a fissile nucleus and a second neutron from the same fission event can be captured on a fissile nucleus and, thereby, induce fission. In particular, if either of these arrangements is steady-state, then sufficient conditions for propagating a nuclear fission deflagration wave in the given material can be satisfied.

Due to beta-decay in the process of converting a fertile nucleus to a fissile nucleus, the characteristic speed of wave advance is of the order of the ratio of the distance traveled by a neutron from its fission-birth to its radiative capture on a fertile nucleus (that is, a mean free path) to the half-life of the (longest-lived nucleus in the chain of) beta-decay leading from the fertile nucleus to the fissile one. Such a characteristic fission neutron-transport distance in normal-density actinides is approximately 10 cm and the beta-decay half-life is $10^5$-$10^6$ seconds for most cases of interest. Accordingly for some designs, the characteristic wave-speed is $10^{-4}$-$10^{-7}$ cm sec$^{-1}$, or approximately $10^{-13}$-$10^{-14}$ of that of a typical nuclear detonation wave. Such a relatively slow speed-of-advance indicates that the wave can be characterized as a deflagration wave, rather than a detonation wave.

If the deflagration wave attempts to accelerate, its leading-edge counters ever-more-pure fertile material (which is relatively lossy in a neutronic sense), for the concentration of fissile nuclei well ahead of the center of the wave becomes exponentially low. Thus the wave's leading-edge (referred to herein as a "burnfront") stalls or slows. Conversely, if the wave slows, the local concentration of fissile nuclei arising from continuing beta-decay increases, the local rates of fission and neutron production rise, and the wave's leading-edge, that is the burnfront, accelerates.

Finally, if the heat associated with nuclear fission is removed sufficiently rapidly from all portions of the configuration of initially fertile matter in which the wave is propagating, the propagation may take place at an arbitrarily low material temperature—although the temperatures of both the neutrons and the fissioning nuclei may be around 1 MeV.

Such conditions for initiating and propagating a nuclear fission deflagration wave can be realized with readily available materials. While fissile isotopes of actinide elements are rare terrestrially, both absolutely and relative to fertile isotopes of these elements, fissile isotopes can be concentrated, enriched and synthesized. The use of both naturally-occurring and man-made ones, such as $^{235}$U and $^{239}$Pu, respectively, in initiating and propagating nuclear fission detonation waves is well-known.

Consideration of pertinent neutron cross-sections (shown in FIGS. 2A and 2B) suggests that a nuclear fission deflagration wave can burn a large fraction of a core of naturally-occurring actinides, such as $^{232}$Th or $^{238}$U, if the neutron spectrum in the wave is a 'hard' or 'fast' one. That is, if the neutrons which carry the chain reaction in the wave have energies which are not very small compared to the approximately 1 MeV at which they are evaporated from nascent fission fragments, then relatively large losses to the space-time-local neutron economy can be avoided when the local mass-fraction of fission products becomes comparable to that of the fertile material (recalling that a single mole of fissile material fission-converts to two moles of fission-product nuclei). Even neutronic losses to typical neutron-reactor structural materials, such as Ta, which has desirable high-temperature properties, may become substantial at neutron energies ≤0.1 MeV.

Another consideration is the (comparatively small) variation with incident neutron energy of the neutron multiplicity of fission, ν, and the fraction of all neutron capture events which result in fission (rather than merely γ-ray emission). The algebraic sign of the function α(ν-2) constitutes a condition for the feasibility of nuclear fission deflagration wave propagation in fertile material compared with the overall fissile isotopic mass budget, in the absence of neutron leakage from the core or parasitic absorptions (such as on fission products) within its body, for each of the fissile isotopes of the reactor core assembly 14. The algebraic sign is generally positive for all fissile isotopes of interest, from fission neutron-energies of approximately 1 MeV down into the resonance capture region.

The quantity α(ν-2)/ν upper-bounds the fraction of total fission-born neutrons which may be lost to leakage, parasitic absorption, or geometric divergence during deflagration wave propagation. It is noted that this fraction is 0.15-0.30 for the major fissile isotopes over the range of neutron energies which prevails in all effectively unmoderated actinide isotopic configurations of practical interest (approximately 0.1-1.5 MeV). In contrast to the situation prevailing for neutrons of (epi-) thermal energy (see FIG. 2B), in which the parasitic losses due to fission products dominate those of fertile-to-fissile conversion by 1-1.5 decimal orders-of-magnitude, fissile element generation by capture on fertile isotopes is favored over fission-product capture by 0.7-1.5 orders-of-magnitude over the neutron energy range 0.1-1.5 MeV. The former suggests that fertile-to-fissile conversion will be feasible only to the extent of 1.5-5% percent at-or-near thermal neutron energies, while the latter indicates that conversions in excess of 50% may be expected for near-fission energy neutron spectra.

In considering conditions for propagation of a nuclear fission deflagration wave, in some approaches neutron leakage may be effectively ignored for very large, "self-reflected" actinide configurations. Referring to FIG. 2B and analytic estimates of the extent of neutron moderation-by-scattering entirely on actinide nuclei, it will be appreciated that deflagration wave propagation can be established in sufficiently large configurations of the two types of actinides that are relatively abundant terrestrially: $^{232}$Th and $^{238}$U, the exclusive and the principal (that is, longest-lived) isotopic components of naturally-occurring thorium and uranium, respectively.

Specifically, transport of fission neutrons in these actinide isotopes will likely result in either capture on a fertile isotopic nucleus or fission of a fissile one before neutron energy has decreased significantly below 0.1 MeV (and thereupon becomes susceptible with non-negligible likelihood to capture on a fission-product nucleus). Referring to FIG. 2A, it will be appreciated that fission product nuclei concentrations can significantly exceed fertile ones and fissile nuclear concentrations may be an order-of-magnitude less than the lesser of fission-product or fertile ones while remaining quantitatively substantially reliable. Consideration of pertinent neutron scattering cross-sections suggests that right circular cylindrical configurations of actinides which are sufficiently extensive to be effectively infinitely thick—that is, self-reflecting—to fission neutrons in their radial dimension will have density-radius products >>200 gm/cm$^2$—that is, they will have radii >>10-20 cm of solid-density $^{238}$U-$^{232}$Th.

The breeding-and-burning wave provides sufficient excess neutrons to breed new fissile material 1-2 mean-free-paths into the yet-unburned fuel, effectively replacing the fissile fuel burnt in the wave. The 'ash' behind the burn-wave's peak is substantially 'neutronically neutral', since the neutronic reactivity of its fissile fraction is just balanced by the parasitic absorptions of structure and fission product inventories on top of leakage. If the fissile atom inventory in the wave's center and just in advance of it is time-stationary as the wave propagates, then it is doing so stably; if less, then the wave is 'dying', while if more, the wave may be said to be 'accelerating.'

Thus, a nuclear fission deflagration wave may be propagated and maintained in substantially steady-state conditions for long time intervals in configurations of naturally-occurring actinide isotopes.

The above discussion has considered, by way of non-limiting example, circular cylinders of natural uranium or thorium metal of less than a meter or so diameter—and that may be substantially smaller in diameter if efficient neutron reflectors are employed—that may stably propagate nuclear fission deflagration waves for arbitrarily great axial distances. However, propagation of nuclear fission deflagration waves is not to be construed to be limited to circular cylinders, to symmetric geometries, or to singly-connected geometries. To that end, additional embodiments of alternate geometries of nuclear fission deflagration wave reactor cores are described in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference.

Propagation of a nuclear fission deflagration wave has implications for embodiments of the nuclear fission nuclear fission deflagration wave reactor 10. As a first example, local material temperature feedback can be imposed on the local nuclear reaction rate at an acceptable expense in the deflagration wave's neutron economy. Such a large negative temperature coefficient of neutronic reactivity confers an ability to control the speed-of-advance of the deflagration wave. If very little thermal power is extracted from the burning fuel, its temperature rises and the temperature-dependent reactivity falls, and the nuclear fission rate at wave-center becomes correspondingly small and the wave's equation-of-time reflects only a very small axial rate-of-advance. Similarly, if the thermal power removal rate is large, the material temperature decreases and the neutronic reactivity rises, the intrawave neutron economy becomes relatively undamped, and the wave advances axially relatively rapidly. Details regarding illustrative implementations of temperature feedback that may be incorporated within embodiments of the reactor core assembly 14 are described in U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference.

As a second example of implications of propagation of a nuclear fission deflagration wave on embodiments of the nuclear fission nuclear fission deflagration wave reactor 10, less than all of the total fission neutron production in the nuclear fission nuclear fission deflagration wave reactor 10 may be utilized. For example, the local material-temperature thermostating modules may use around 5-10% of the total fission neutron production in the nuclear fission nuclear fission deflagration wave reactor 10. Another ≤10% of the total fission neutron production in the nuclear fission nuclear fission deflagration wave reactor 10 may be lost to parasitic absorption in the relatively large quantities of high-performance, high temperature, structure materials (such as Ta, W, or Re) employed in structural components of the nuclear fission nuclear fission deflagration wave reactor 10. This loss occurs in order to realize ≥60% thermodynamic efficiency in conversion to electricity and to gain high system safety figures-of-merit. The Zs of these materials, such as Ta, W and Re, are approximately 80% of that of the actinides, and thus their radiative capture cross-sections for high-energy neutrons are not particularly small compared to those of the actinides, as is indicated for Ta in FIGS. 2A and 2B. A final 5-10% of the total fission neutron production in the nuclear fission nuclear fission deflagration wave reactor 10 may be lost to parasitic absorption in fission products. As noted above, the neutron economy characteristically is sufficiently rich that approximately 0.7 of total fission neutron production is sufficient to sustain deflagration wave-propagation in the absence of leakage and rapid geometric divergence. This is in sharp contrast with (epi) thermal-neutron power reactors employing low-enrichment fuel, for which neutron-economy discipline in design and operation must be strict.

Figure 2C:
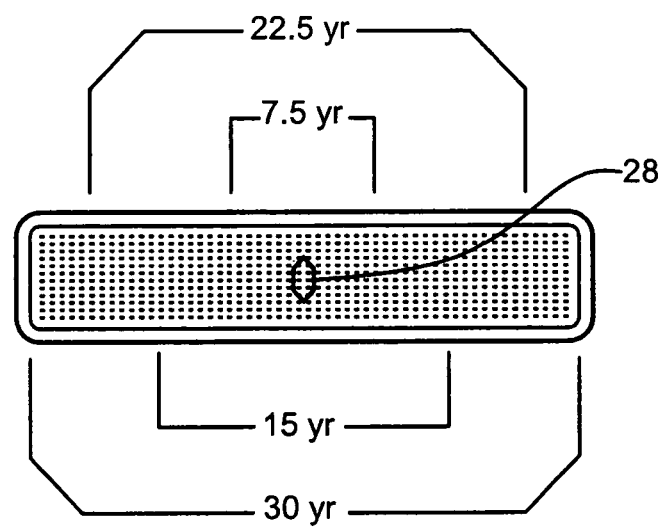
FIGS. 2C through 2G illustrate relative concentrations during times at operation of a nuclear fission reactor at power.
Figure 2D:
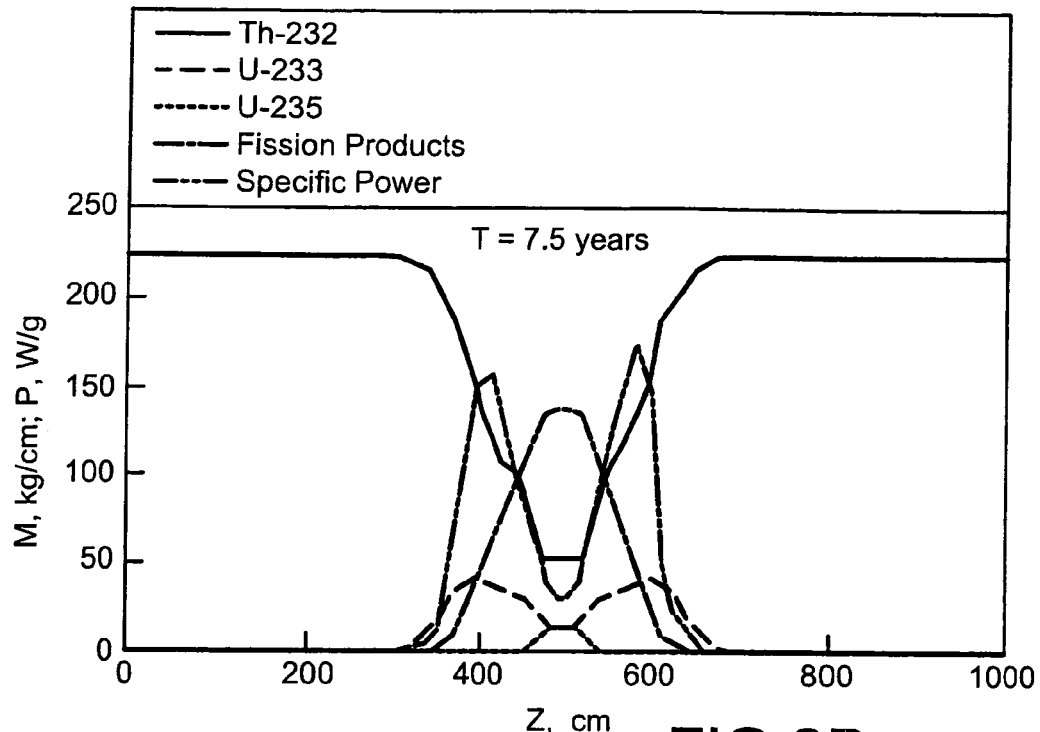
Figure 2E:
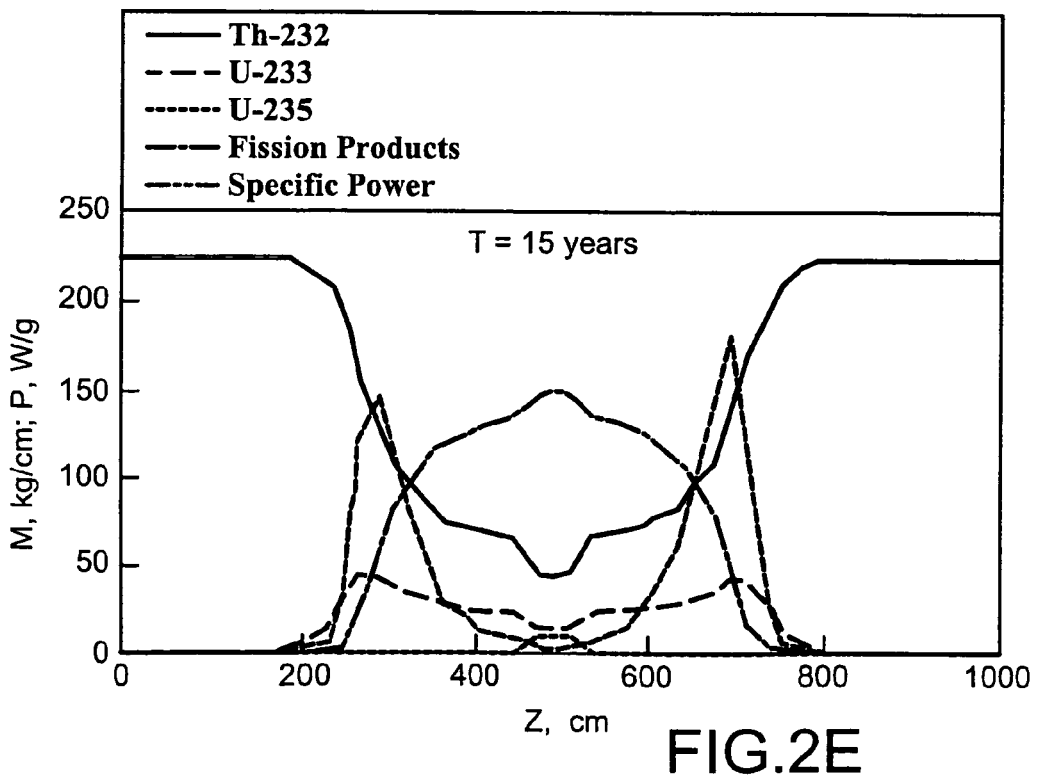
Figure 2F:
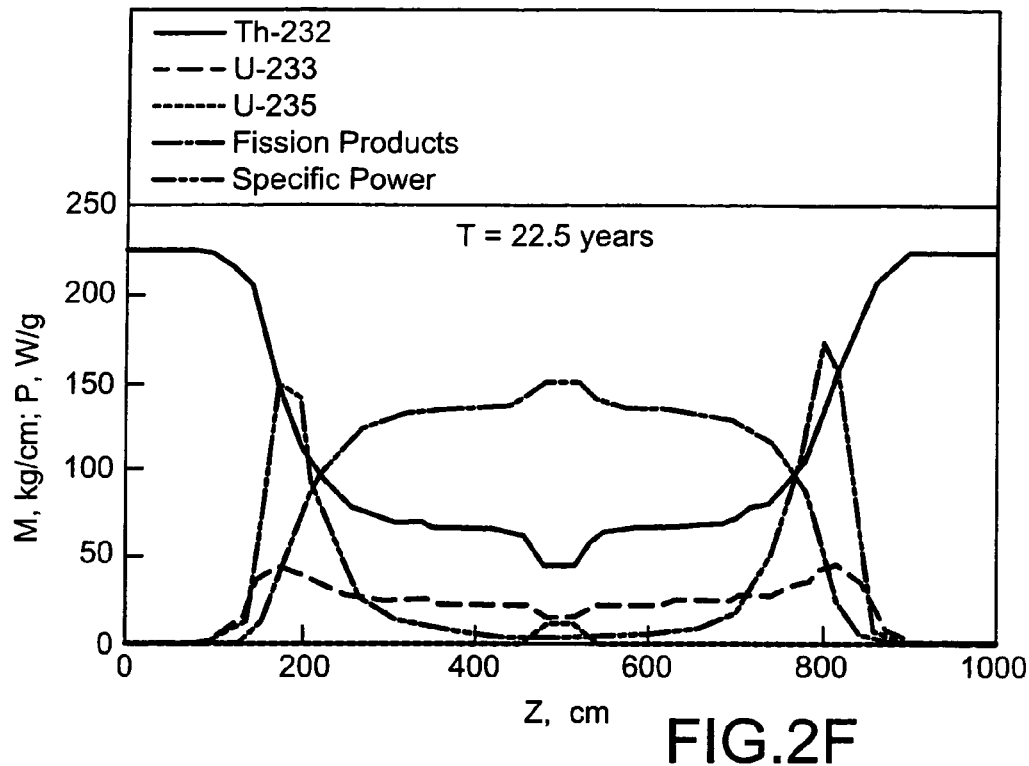
Figure 2G:
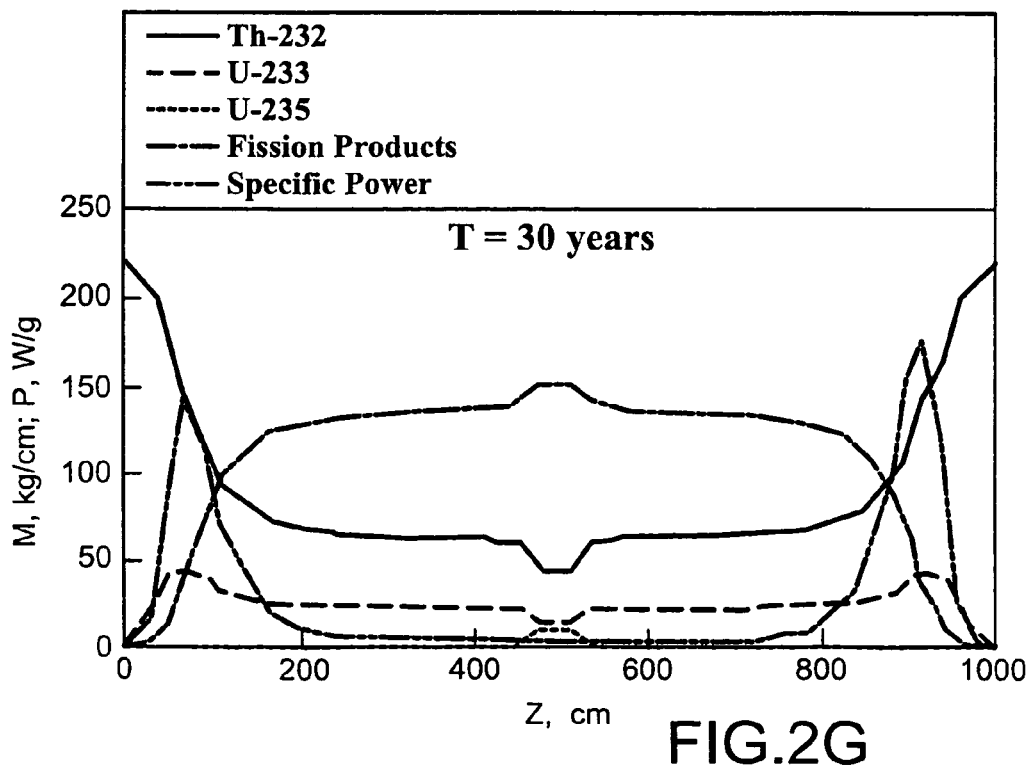

As a third example of implications of propagation of a nuclear fission deflagration wave on embodiments of the nuclear fission deflagration wave reactor 10, high burn-ups (on the order of around 50% to around 80%) of initial actinide fuel-inventories which are characteristic of the nuclear fission deflagration waves permit high-efficiency utilization of as-mined fuel—moreover without a requirement for reprocessing. Referring now to FIGS. 2C-2G, features of the fuel-charge of embodiments of the reactor core assembly 14 are depicted at four equi-spaced times during the operational life of the reactor after origination of the nuclear fission deflagration wave (referred to herein as "nuclear fission ignition") in a scenario in which full reactor power is continuously demanded over a ⅓ century time-interval. In the embodiment shown, two nuclear fission deflagration wavefronts propagate from an origination point 28 (near the center of the reactor core assembly 14 and in which the nuclear fission igniter is located) toward ends of the reactor core assembly 14. Corresponding positions of the leading edge of the nuclear fission deflagration wave-pair at various time-points after full ignition of the fuel-charge of the reactor core assembly 14 are indicated in FIG. 2C. FIGS. 2D, 2E, 2F, and 2G illustrate masses (in kg of total mass per cm of axial core-length) of various isotopic components in a set of representative near-axial zones and fuel specific power (in W/g) at the indicated axial position as ordinate-values versus axial position along an illustrative, non-limiting 10-meter-length of the fuel-charge as an abscissal value at approximate times after nuclear fission ignition of approximately 7.5 years, 15 years, 22.5 years, and 30 years, respectively. The central perturbation is due to the presence of the nuclear fission igniter indicated by the origination point 28 (FIG. 2C).

It will be noted that the neutron flux from the most intensely burning region behind the burnfront breeds a fissile isotope-rich region at the burnfront's leading-edge, thereby serving to advance the nuclear fission deflagration wave. After the nuclear fission deflagration wave's burnfront has swept over a given mass of fuel, the fissile atom concentration continues to rise for as long as radiative capture of neutrons on available fertile nuclei is considerably more likely than on fission product nuclei, while ongoing fission generates an ever-greater mass of fission products. Nuclear power-production density peaks in this region of the fuel-charge, at any given moment. It will also be noted that in the illustrated embodiments, differing actions of two slightly different types of thermostating units on the left and the right sides of the nuclear fission igniter account for the corresponding slightly differing power production levels.

Still referring to FIGS. 2D-2G, it can be seen that well behind the nuclear fission deflagration wave's advancing burnfront, the concentration ratio of fission product nuclei (whose mass closely averages half that of a fissile nucleus) to fissile ones climbs to a value comparable to the ratio of the fissile fission to the fission product radiative capture cross-sections (FIG. 2A), the "local neutronic reactivity" thereupon goes slightly negative, and both burning and breeding effectively cease—as will be appreciated from comparing FIGS. 2D, 2E, 2F, and 2G with each other, far behind the nuclear fission deflagration wave burnfront.

In some embodiments of the nuclear fission deflagration wave reactor 10, all the nuclear fission fuel ever used in the reactor is installed during manufacture of the reactor core assembly 14. Also, in some configurations no spent fuel is ever removed from the reactor core assembly 14. In one approach, such embodiments may allow operation without ever accessing the wave reactor core 14 after nuclear fission ignition up to and perhaps after completion of propagation of the burnfront. However, in some other embodiments of the nuclear fission deflagration wave reactor 10, additional nuclear fission fuel may be added to the reactor core assembly 14 after nuclear fission ignition. In some other embodiments of the nuclear fission deflagration wave reactor 10, spent fuel may be removed from the reactor core assembly (and, in some embodiments, removal of spent fuel from the reactor core assembly 14 may be performed while the nuclear fission deflagration wave reactor 10 is operating at power). Such illustrative refueling and defueling is explained in U.S. patent application Ser. No. 11/605,848, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference. Regardless of whether or not spent fuel is removed, pre-expansion of the as-loaded fuel permits higher-density actinides to be replaced with lower-density fission products without any overall volume changes in fuel elements, as the nuclear fission deflagration wave sweeps over any given axial element of actinide 'fuel,' converting it into fission-product 'ash.'

Given by way of overview, launching of nuclear fission deflagration waves into $^{232}$Th or $^{238}$U fuel-charges can initiate with 'nuclear fission igniter modules' enriched in fissile isotopes. Illustrative nuclear fission igniter modules and methods for launching nuclear fission deflagration waves are discussed in detail in a co-pending U.S. patent application Ser. No. 12/069,908, entitled NUCLEAR FISSION IGNITER naming CHARLES E. AHLFELD, JOHN ROGERS GILLELAND, RODERICK A. HYDE, MURIEL Y. ISHIKAWA, DAVID G. MCALEES, NATHAN P. MYHRVOLD, CHARLES WITMER, AND LOWELL L. WOOD, JR. as inventors, filed 12 Feb. 2008, the contents of which are hereby incorporated by reference. Higher enrichments can produce more compact modules, and minimum mass modules may employ moderator concentration gradients. In addition, nuclear fission igniter module design may be determined in part by non-technical considerations, such as resistance to materials diversion for military purposes in various scenarios.

In other approaches, illustrative nuclear fission igniters may have other types of reactivity sources. For example, other nuclear fission igniters may include "burning embers", e.g., nuclear fission fuel enriched in fissile isotopes via exposure to neutrons within a propagating nuclear fission deflagration wave reactor. Such "burning embers" may function as nuclear fission igniters, despite the presence of various amounts of fission products "ash". In other approaches to launching a nuclear fission deflagration wave, nuclear fission igniter modules enriched in fissile isotopes may be used to supplement other neutron sources that use electrically driven sources of high energy ions (such as protons, deuterons, alpha particles, or the like) or electrons that may in turn produce neutrons. In one illustrative approach, a particle accelerator, such as a linear accelerator may be positioned to provide high energy protons to an intermediate material that may in turn provide such neutrons (e.g., through spallation). In another illustrative approach, a particle accelerator, such as a linear accelerator may be positioned to provide high energy electrons to an intermediate material that may in turn provide such neutrons (e.g., by electro-fission and/or photofission of high-Z elements). Alternatively, other known neutron emissive processes and structures, such as electrically induced fusion approaches, may provide neutrons (e.g., 14 Mev neutrons from D-T fusion) that may thereby be used in addition to nuclear fission igniter modules enriched in fissile isotopes to initiate the propagating fission wave.

Now that nucleonics of the fuel charge and the nuclear fission deflagration wave have been discussed, further details regarding "nuclear fission ignition" and maintenance of the nuclear fission deflagration wave will be discussed. A centrally-positioned illustrative nuclear fission igniter moderately enriched in fissionable material, such as $^{235}$U or $^{239}$Pu, has a neutron-absorbing material (such as a borohydride) removed from it (such as by operator-commanded electrical heating), and the nuclear fission igniter becomes neutronically critical. Local fuel temperature rises to a design set-point and is regulated thereafter by the local thermostating modules (discussed in detail in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference). Neutrons from the fast fission of $^{235}$U or $^{239}$Pu are mostly captured at first on local $^{238}$U or $^{232}$Th.

It will be appreciated that uranium enrichment of the nuclear fission igniter may be reduced to levels not much greater than that of light water reactor (LWR) fuel by introduction into the nuclear fission igniter and the fuel region immediately surrounding it of a radial density gradient of a refractory moderator, such as graphite. High moderator density enables low-enrichment fuel to burn satisfactorily, while decreasing moderator density permits efficient fissile breeding to occur. Thus, optimum nuclear fission igniter design may involve trade-offs between proliferation robustness and the minimum latency from initial criticality to the availability of full-rated-power from the fully-ignited fuel-charge of the core. Lower nuclear fission igniter enrichments entail more breeding generations and thus impose longer latencies.

The peak (unregulated) reactivity of the reactor core assembly 14 slowly decreases in the first phase of the nuclear fission ignition process because, although the total fissile isotope inventory is increasing monotonically, this total inventory is becoming more spatially dispersed. As a result of choice of initial fuel geometry, fuel enrichment versus position, and fuel density, it may be arranged for the maximum reactivity to still be slightly positive at the time-point at which its minimum value is attained. Soon thereafter, the maximum reactivity begins to increase rapidly toward its greatest value, corresponding to the fissile isotope inventory in the region of breeding substantially exceeding that remaining in the nuclear fission igniter. For many cases a quasi-spherical annular shell then provides maximum specific power production. At this point, the fuel-charge of the reactor core assembly 14 can be referred to as "ignited."

Propagation of the nuclear fission deflagration wave, also referred to herein as "nuclear fission burning", will now be discussed. In the previously described configuration, the spherically-diverging shell of maximum specific nuclear power production continues to advance radially from the nuclear fission igniter toward the outer surface of the fuel charge. When it reaches the outer surface, it typically breaks into two spherical zonal surfaces, with each surface propagating in a respective one of two opposite directions along the axis of the cylinder. At this time-point, the full thermal power production potential of the core may have been developed. This interval is characterized as that of the launching period of the two axially-propagating nuclear fission deflagration wave burnfronts. In some embodiments the center of the core's fuel-charge is ignited, thus generating two oppositely-propagating waves. This arrangement doubles the mass and volume of the core in which power production occurs at any given time, and thus decreases by two-fold the core's peak specific power generation, thereby quantitatively minimizing thermal transport challenges. However, in other embodiments, the core's fuel charge is ignited at or near one end, as desired for a particular application. Such an approach may result in a single propagating wave in some configurations.

In other embodiments, the core's fuel charge may be ignited in multiple sites. In yet other embodiments, the core's fuel charge is ignited at any 3-D location within the core as desired for a particular application. In some embodiments, two propagating nuclear fission deflagration waves will be initiated and propagate away from a nuclear fission ignition site, however, depending upon geometry, nuclear fission fuel composition, the action of neutron modifying control structures or other considerations, different numbers (e.g., one, three, or more) of nuclear fission deflagration waves may be initiated and propagated. However, for sake of understanding, the discussion herein refers, without limitation, to propagation of two nuclear fission deflagration wave burnfronts.

From this time forward through the break-out of the two waves when they reach or approach the two opposite ends, the physics of nuclear power generation is typically effectively time-stationary in the frame of either wave, as illustrated in FIGS. 2D-2G. The speed of wave advance through the fuel is proportional to the local neutron flux, which in turn is linearly dependent on the thermal power drawn from the reactor core assembly 14 via the collective action on the nuclear fission deflagration wave's neutron budget of the neutron control system, In one approach, the neutron control system may be implemented with thermostating modules (not shown) as has been described in U.S. patent application Ser. No. 11/605, 933, entitled CONTROLLABLE LONG TERM OPERATION OF A NUCLEAR REACTOR, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference.

When more power is demanded from the reactor via lower-temperature coolant flowing into the core, the temperature of the two ends of the core (which in some embodiments are closest to the coolant inlets) decreases slightly below the thermostating modules' design set-point, a neutron absorber is thereby withdrawn from the corresponding sub-population of the core's thermostating modules, and the local neutron flux is permitted thereby to increase to bring the local thermal power production to the level which drives the local material temperature up to the set-point of the local thermostating modules.

However, in the two burnfront embodiment this process is not effective in heating the coolant significantly until its two divided flows move into the two nuclear burn-fronts. These two portions of the core's fuel-charge—which are capable of producing significant levels of nuclear power when not suppressed by the neutron absorbers of the thermostating modules—then act to heat the coolant to the temperature specified by the design set-point of their modules, provided that the nuclear fission fuel temperature does not become excessive (and regardless of the temperature at which the coolant arrived in the core). The two coolant flows then move through the two sections of already-burned fuel centerward of the two burnfronts, removing residual nuclear fission and afterheat thermal power from them, both exiting the fuel-charge at its center. This arrangement encourages the propagation of the two burnfronts toward the two ends of the fuel-charge by "trimming" excess neutrons primarily from the trailing edge of each front, as illustrated in FIGS. 2D-2G.

Thus, the core's neutronics in this configuration may be considered to be substantially self-regulated. For example, for cylindrical core embodiments, the core's nucleonics may be considered to be substantially self-regulating when the fuel density-radius product of the cylindrical core is ≥200 gm/cm$^2$ (that is, 1-2 mean free paths for neutron-induced fission in a core of typical composition, for a reasonably fast neutron spectrum). One function of the neutron reflector in such core design may be to substantially reduce the fast neutron fluence seen by the outer portions of the reactor, such as its radiation shield, structural supports, thermostating modules and outermost shell. The neutron reflector may also impact the performance of the core by increasing the breeding efficiency and the specific power in the outermost portions of the fuel. Such impact may enhance the reactor's economic efficiency. Outlying portions of the fuel-charge are not used at low overall energetic efficiency, but have isotopic burn-up levels comparable to those at the center of the fuel-charge.

Final, irreversible negation of the core's neutronic reactivity may be performed at any time by injection of neutronic poison into the coolant stream as desired. For example, lightly loading a coolant stream with a material such as $BF_3$, possibly accompanied by a volatile reducing agent such as $H_2$ if desired, may deposit metallic boron substantially uniformly over the inner walls of coolant-tubes threading through the reactor's core, via exponential acceleration of the otherwise slow chemical reaction $2BF_3 + 3H_2 \rightarrow 2B + 6HF$ by the high temperatures found therein. Boron, in turn, is a highly refractory metalloid, and will not typically migrate from its site of deposition. Substantially uniform presence of boron in the core in <100 kg quantities may negate the core's neutronic reactivity for indefinitely prolonged intervals without involving the use of powered mechanisms in the vicinity of the reactor.

Figure 1C:
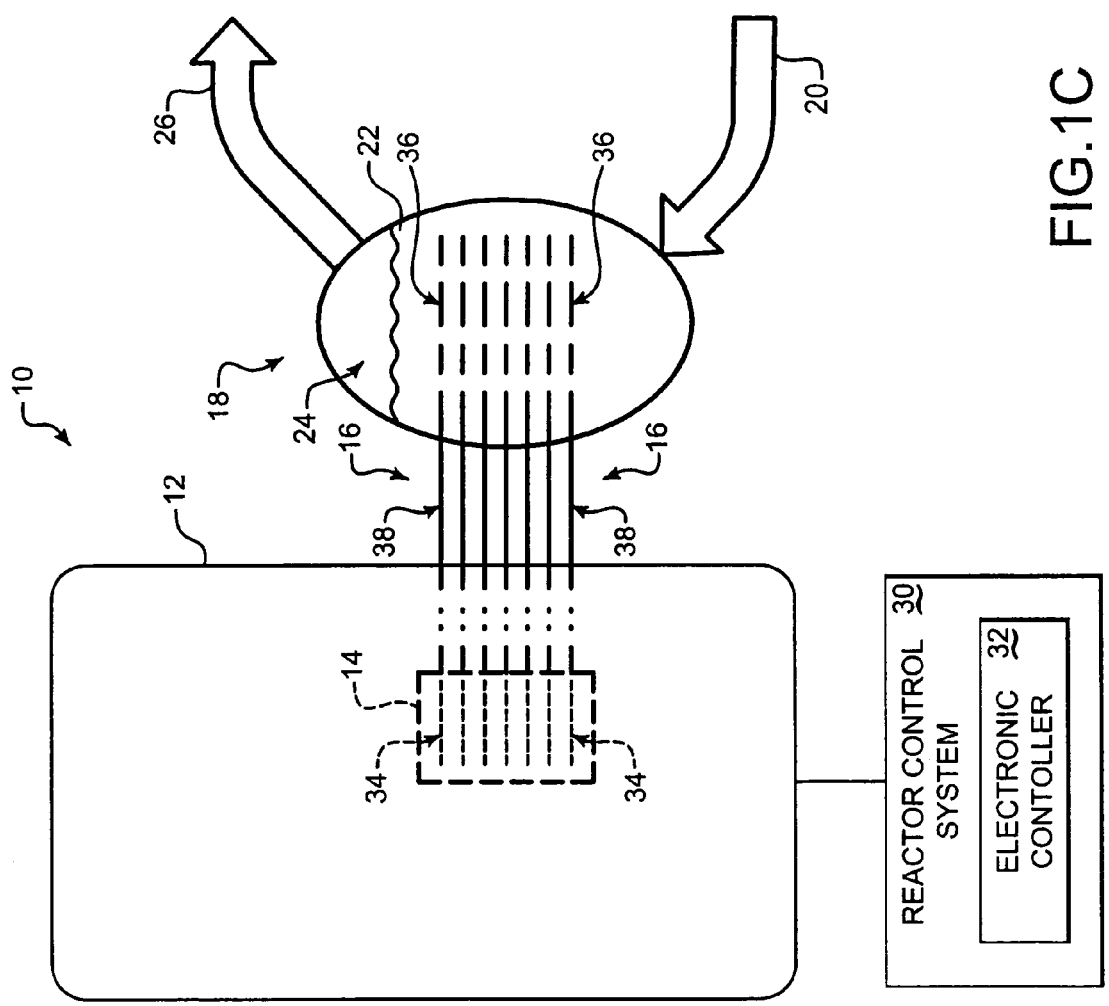
FIG. 1C is a schematic illustration of another illustrative nuclear fission deflagration wave reactor.
Figure 1D:
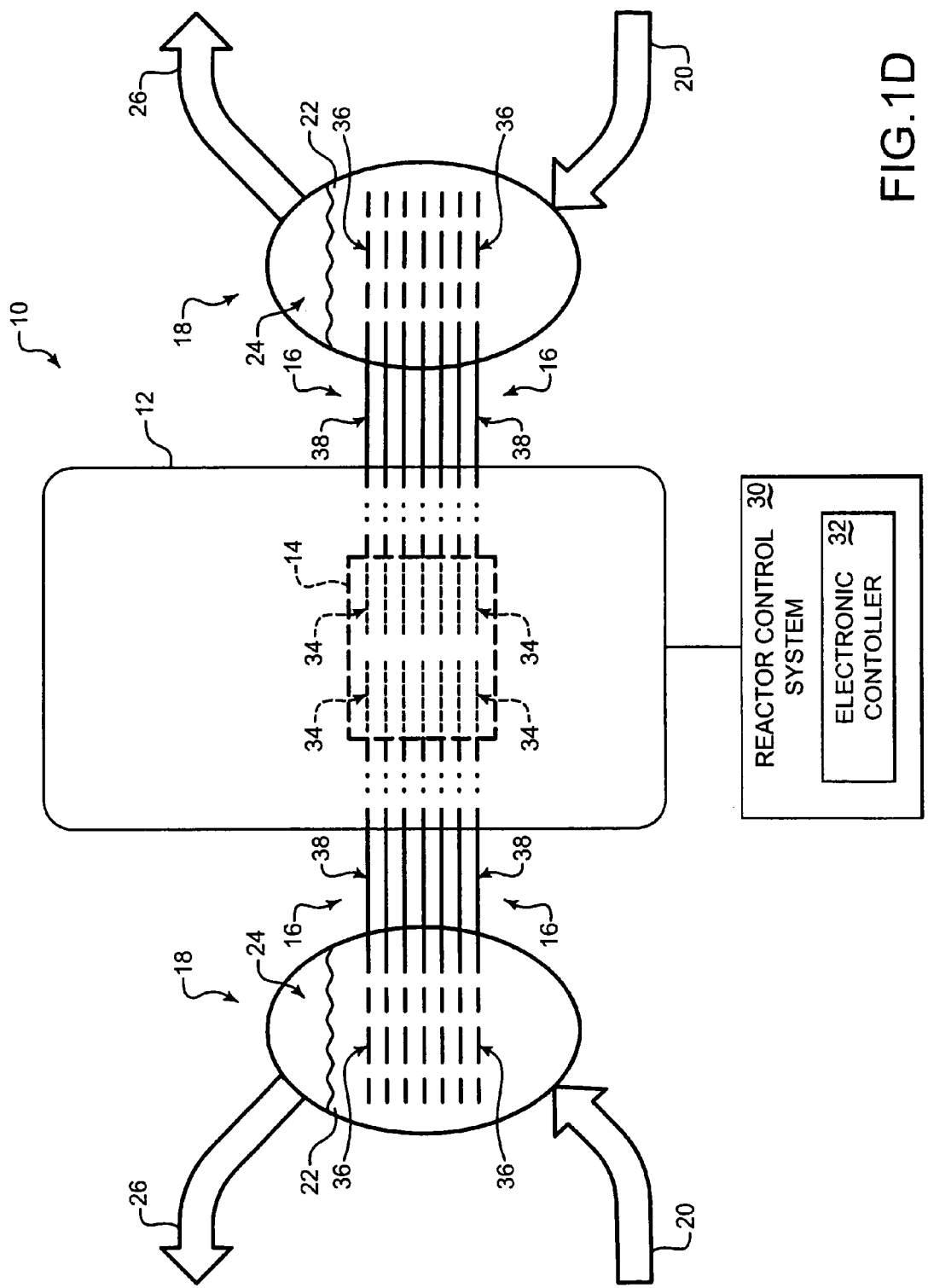
FIG. 1D is a schematic illustration of another illustrative nuclear fission deflagration wave reactor.

While the core's neutronics in the above-described configurations may be considered to be substantially self-regulated, referring to FIGS. 1C and 1D other configurations may operate under control of a reactor control system 30 that includes a suitable electronic controller 32 having appropriate electrical circuitry and that may include a suitable electromechanical system.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Illustrative Embodiments of Nuclear Fission Deflagration Wave Reactor

Now that some of the considerations behind some of the embodiments of the nuclear fission deflagration wave reactor 10 have been set forth, further details regarding illustrative embodiments of the nuclear fission deflagration wave reactor 10 will be explained. It is emphasized that the following description of illustrative embodiments of the nuclear fission deflagration wave reactor 10 is given by way of non-limiting example only and not by way of limitation. As mentioned above, several embodiments of the nuclear fission deflagration wave reactor 10 are contemplated, as well as further aspects of the nuclear fission deflagration wave reactor 10. After details regarding an illustrative embodiment of the nuclear fission deflagration wave reactor 10 are discussed, other embodiments and aspects will also be discussed.

Referring now to FIGS. 1A-1D, the primary heat pipes 16 are disposed in thermal communication with the heat sinks 18. In these arrangements, an evaporator section 34 of the primary heat pipes 16 is disposed in thermal communication with the nuclear fission fuel material (not shown in FIGS. 1A-1D for purposes of clarity). The heat sinks 18 are disposed in thermal communication with a condenser section 36 of the primary heat pipes 16. If desired, the primary heat pipes 16 may also include an adiabatic section 38. Illustrative details of non-limiting aspects of the primary heat pipes 16, such as orientation within the reactor core assembly 14, relationship with the nuclear fission fuel material, and details of illustrative constructions, will be set forth further below.

Referring now to FIGS. 3A-3D, in some other embodiments the nuclear fission deflagration wave reactor 10 may also include at least one secondary heat pipe 40 that is disposed in thermal communication with the primary heat pipes 16. In some embodiments at least one heat sink 18 may be disposed in thermal communication with the secondary heat pipes 40. In the examples shown by way of illustration and not limitation when the heat sink 18 is a steam generator, heat is transferred from the secondary heat pipes 40 to the feedwater 22, and the feedwater 22 is transformed in phase from liquid to steam 24.

It will be noted that at least one secondary heat pipe 40 is disposed in thermal communication with the primary heat pipes 16. Thus, in some embodiments and similar to the primary heat pipes 16, one secondary heat pipe 40 may be disposed in thermal communication with at least one primary heat pipe 16. Likewise, in some other embodiments, more than one secondary heat pipe 40 may be disposed in thermal communication with the primary heat pipes 16. While the drawings illustrate more than one secondary heat pipe 40 included in various embodiments of the nuclear fission deflagration wave reactor 10, such drawings are for illustration purposes only and are not intended to be limiting. To that end, the number of secondary heat pipes 40 disposed in thermal communication with the primary heat pipes 16 is not limited in any manner whatsoever. Instead, any number of secondary heat pipes 40 may be disposed in thermal communication with the primary heat pipes 16 as desired for a particular application, depending upon without limitation power production requirements, spatial constraints, regulatory restrictions, or the like.

For sake of clarity and similar to the primary heat pipes 16, references to "at least one secondary heat pipe 40" in the description that follows (such as in the context of discussions of various embodiments of the nuclear fission deflagration wave reactor 10) will be made to "the secondary heat pipes 40". Nonetheless, it will be appreciated that such references to "the secondary heat pipes 40" are made for purposes of clarity and are not intended to limit the number of secondary heat pipes 40 to more than one secondary heat pipe 40.

Figure 3A:
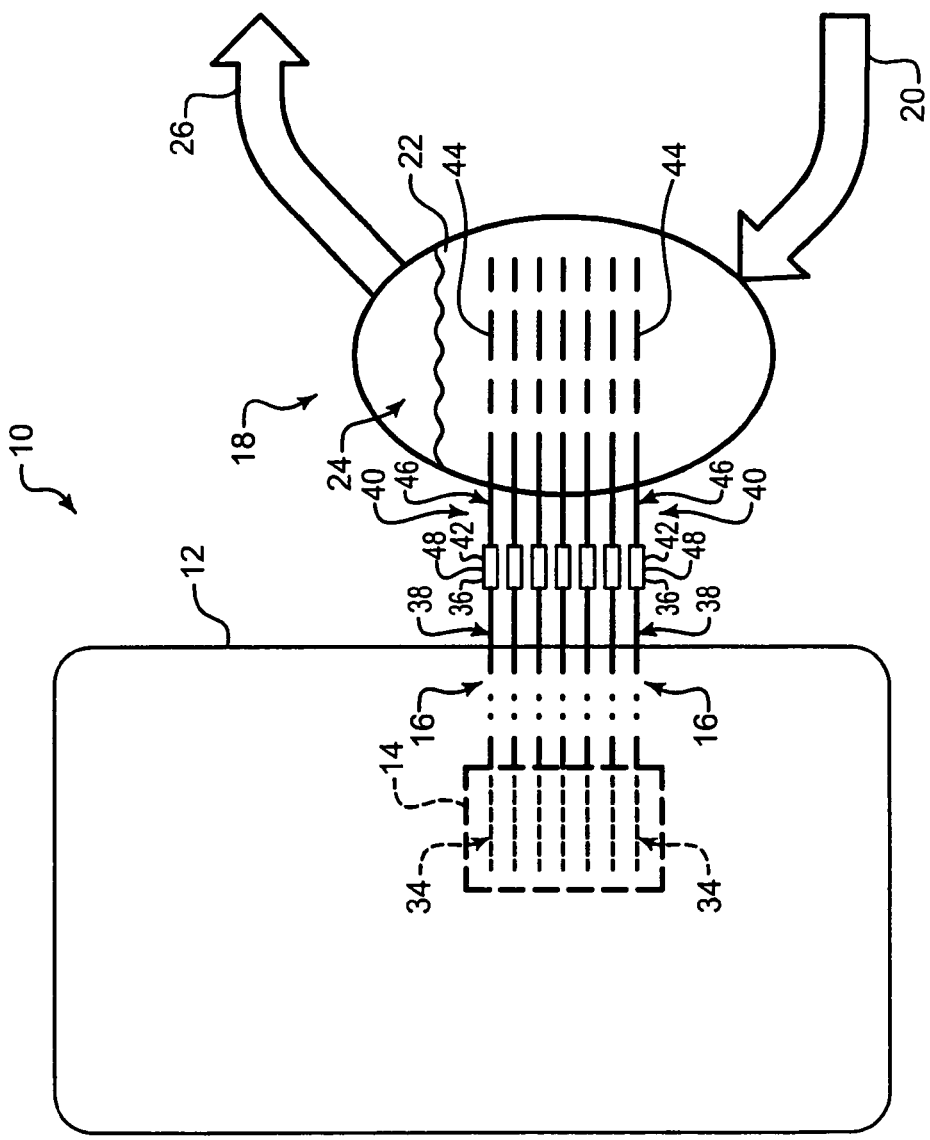
FIG. 3A is a schematic illustration of another illustrative nuclear fission deflagration wave reactor.
Figure 3B:
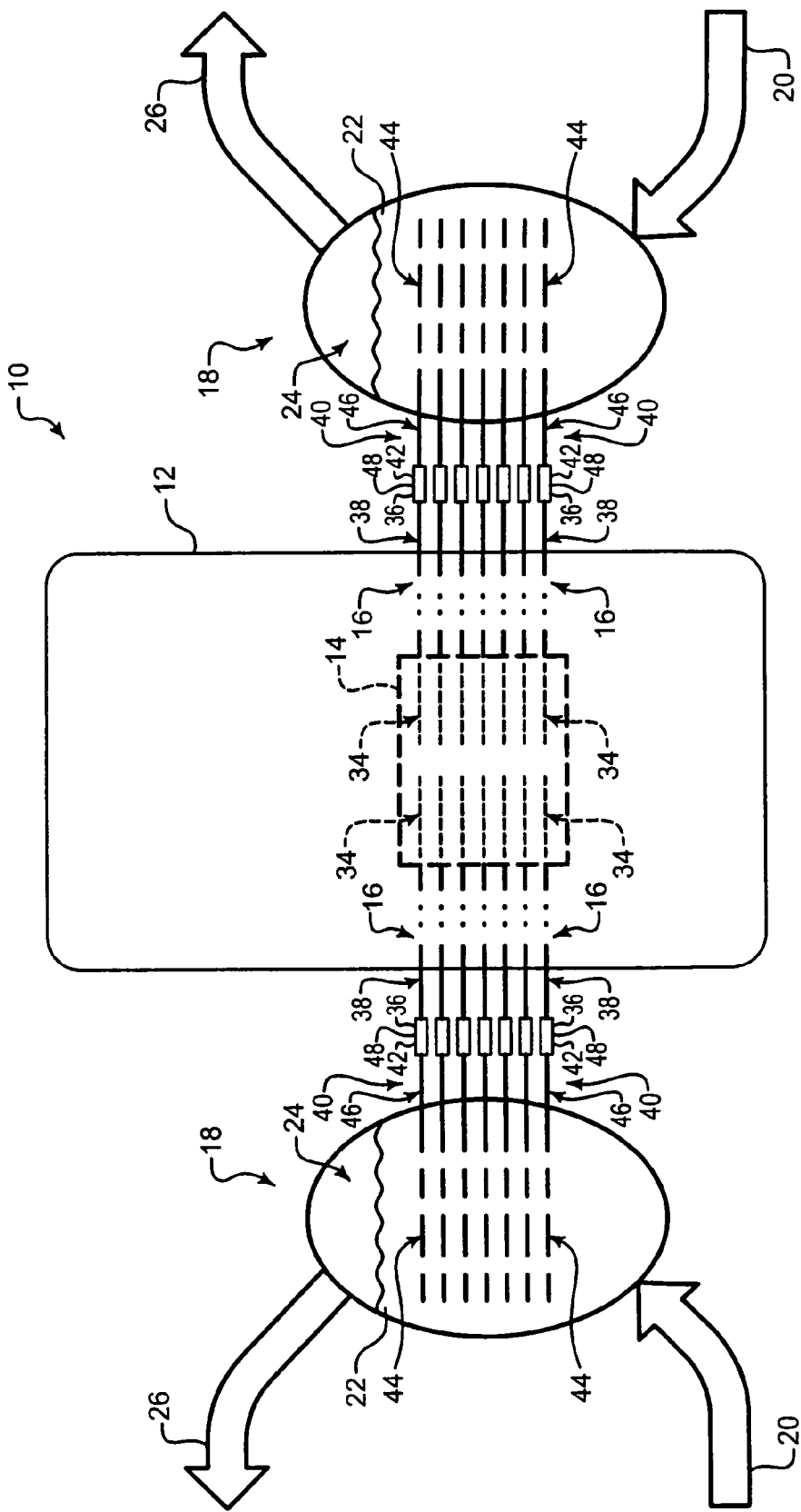
FIG. 3B is a schematic illustration of another illustrative nuclear fission deflagration wave reactor.
Figure 3C:
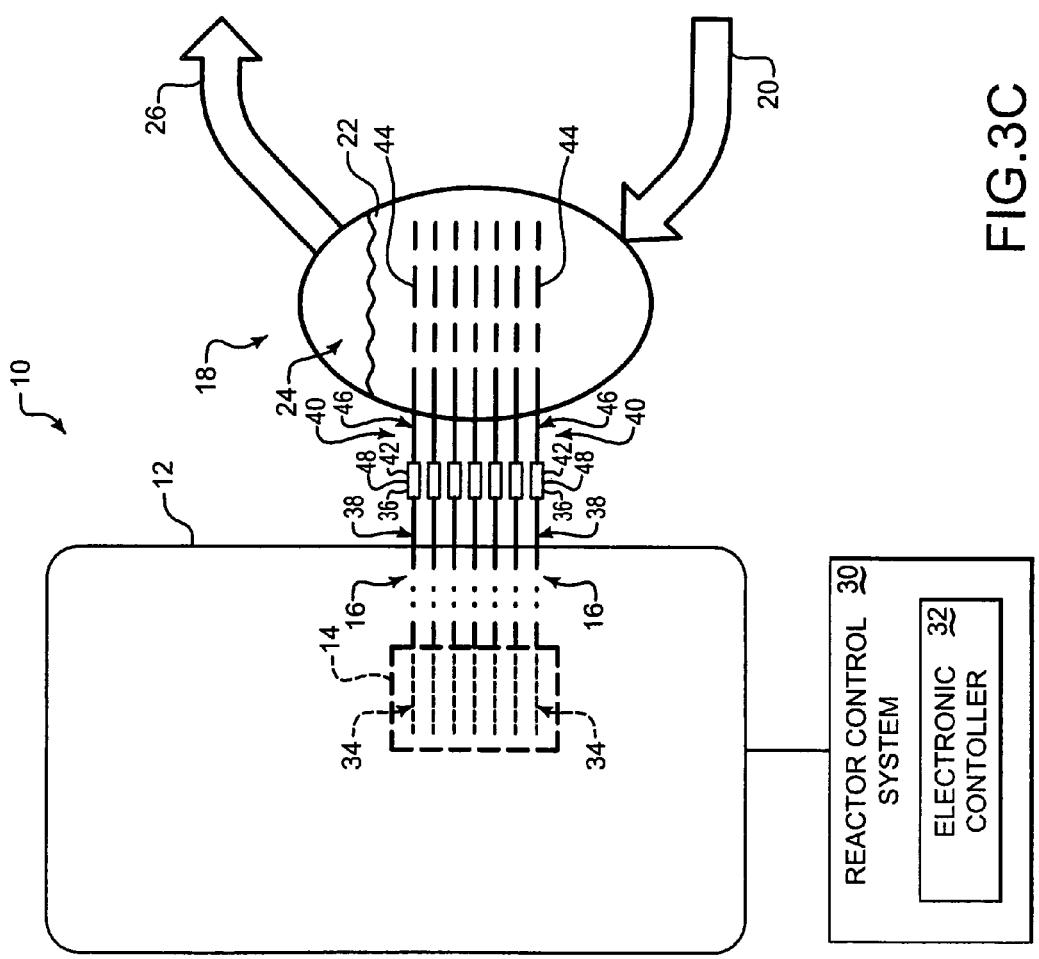
FIG. 3C is a schematic illustration of another illustrative nuclear fission deflagration wave reactor.
Figure 3D:
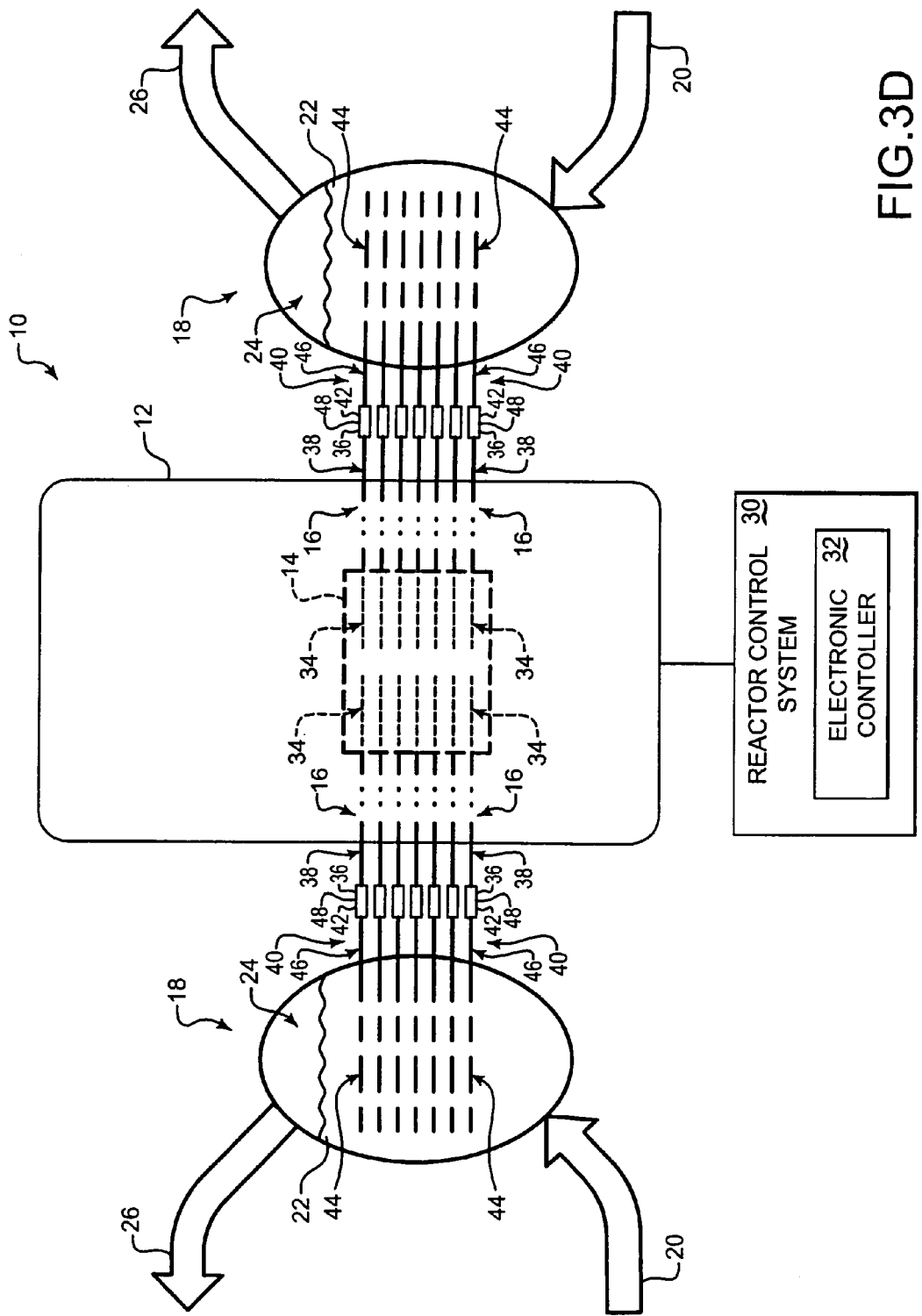
FIG. 3D is a schematic illustration of another illustrative nuclear fission deflagration wave reactor.

As in the examples discussed above, any number of the heat sinks 18 may be provided as desired for a particular application. For example, as shown in FIGS. 3A and 3C some embodiments include one heat sink 18. As shown in FIGS. 3B and 3D, some embodiments may include two of the heat sinks 18. For sake of brevity, additionally embodiments in which more than two of the heat sinks 18 are not shown. Nonetheless, it will be appreciated that no limit to the number of heat sinks 18 is intended and no limit should be inferred. Therefore, for the same clarity reasons as discussed above for the primary heat pipes 16 and the secondary heat pipes 40, references will be made to the heat sinks 18 without intention to limit the number of heat sinks to more than one heat sink 18.

While the core's neutronics in the configurations shown in FIGS. 3A and 3B may be considered to be substantially self-regulated, the core's neutronics in the configurations shown in FIGS. 3C and 3D may operate under control of the reactor control system 30 that includes the electronic controller 32 having appropriate electrical circuitry and that may include a suitable electro-mechanical system. These features have been described above, and their details need not be repeated for an understanding thereof.

An evaporator section 42 of the secondary heat pipes 40 is disposed in thermal communication with the condenser section 36 of the primary heat pipes 16. The heat sinks 18 are disposed in thermal communication with a condenser section 44 of the secondary heat pipes 40. If desired, the secondary heat pipes 40 may also include an adiabatic section 46. Illustrative details of non-limiting aspects of the secondary heat pipes 40, such as details of illustrative constructions, will be set forth further below.

The evaporator section 42 of the secondary heat pipe 40 is disposed in thermal communication with the condenser section 36 of the primary heat pipe 16. That is, heat from the condenser section 36 of the primary heat pipe 16 can be transferred to the evaporator section 42 of the secondary heat pipe 40. Among other things, in order to help maintain physical positioning of the evaporator section 42 of the secondary heat pipe 40 relative to the condenser section 36 of the primary heat pipe 16, in some embodiments the condenser section 36 of the primary heat pipe 16 and the evaporator section 42 of the secondary heat pipe 40 may be disposed within a coupling device 48.

In addition to helping maintain physical positioning of the evaporator section 42 of the secondary heat pipe 40 relative to the condenser section 36 of the primary heat pipe 16, the coupling device 48 can also help provide containment in the event of a primary-to-secondary leak.

Moreover, the coupling device 48 also can help facilitate transfer of heat from the condenser section 36 of the primary heat pipe 16 to the evaporator section 42 of the secondary heat pipe 40. To that end, the coupling device 48 can help reduce loss of heat to ambient. Further, if desired a heat transfer medium 50 (not shown in FIGS. 3A-3D; see FIGS. 3E-3G and 3I) may be provided within the coupling device 48 to help further facilitate transfer of heat from the condenser section 36 of the primary heat pipe 16 to the evaporator section 42 of the secondary heat pipe 40. Given by way of example and not of limitation, the heat transfer medium 50 may include any heat transfer medium suitable for high temperature operations, such as without limitation $^7$Li, sodium, potassium, or the like.

The condenser section 36 of the primary heat pipe 16 and the evaporator section 42 of the secondary heat pipe 40 may be disposed adjacent each other within the coupling device 48. For example and referring additionally to FIGS. 3E and 3F, in some embodiments the condenser section 36 of the primary heat pipe 16 and the evaporator section 42 of the secondary heat pipe 40 may be disposed laterally adjacent each other within the coupling device 48. As shown in FIG. 3E, the condenser section 36 of the primary heat pipe 16 and the evaporator section 42 of the secondary heat pipe 40 may be disposed laterally adjacent in an end-to-end manner relative to each other. As shown in FIG. 3F, the condenser section 36 of the primary heat pipe 16 and the evaporator section 42 of the secondary heat pipe 40 may be disposed laterally adjacent in an overlapping, "side-to-side" manner relative to each other.

In some other embodiments the condenser section 36 of the primary heat pipe 16 and the evaporator section 42 of the secondary heat pipe 40 may be disposed radially adjacent each other within the coupling device 48. Such an arrangement can help provide even further containment in the event of a primary-to-secondary leak. For example and referring additionally to FIGS. 3G and 3H, in some embodiments the condenser section 36 of the primary heat pipe 16 may be radially disposed within the evaporator section 42 of the secondary heat pipe 40. In some other embodiments and referring additionally to FIGS. 3I and 3J, the evaporator section 42 of the secondary heat pipe 40 may be radially disposed within the condenser section 36 of the primary heat pipe 16.

Referring now to FIG. 4, in some embodiments one of the heat sinks may be an internal heat sink 52 that is disposed internal to the reactor vessel 12. Thus, the features shown in FIG. 4 can represent a portion of any of the arrangements shown in FIGS. 1A-1D and 3A-3D.

The internal heat sink is in thermal communication with an internal heat pipe 54. The internal heat pipe 54 is disposed in thermal communication with the nuclear fission fuel material. As such, the internal heat pipe 54, when provided, may be considered to be one of the primary heat pipes 16. An evaporator section 56 of the internal heat pipe 54 is disposed in thermal communication with the nuclear fission fuel material. The internal heat sink 52 is disposed in thermal communication with a condenser section 58 of the internal heat pipe 54. The internal heat pipe 54 need not include an adiabatic section. In some embodiments, the internal heat pipe 54 includes an adiabatic section (not shown for clarity purposes). In some other embodiments, the internal heat pipe 54 does not include an adiabatic section.

The internal heat sink 52 suitably is any type of heat sink as desired for a particular application. In some embodiments the internal heat sink 52 may be a suitable heat transfer device. In some other embodiments the internal heat sink 52 may be a volume of space, which may be at least partially enclosed, within the nuclear reactor vessel 12 in which a workpiece may be placed for heat treatment, annealing, or the like. In some embodiments the internal heat sink 52 may be accessible via an access port 60 defined in the nuclear reactor vessel 12.

The primary heat pipes 16 may be arranged in any suitable manner in thermal communication with the nuclear fission fuel material. In general, heat is transferred from the nuclear fission fuel material to the evaporator section 34 of the primary heat pipes 16. Illustrative nuclear fission fuel material and nucleonics of a nuclear fission deflagration wave have been discussed above and need not be repeated. No limitation is to be inferred regarding specific arrangements in which heat is transferred from the nuclear fission fuel material to the primary heat pipes 16. To that end, some illustrative arrangements will be described below and are given by way of non-limiting examples and not by way of limitation.

Figure 5A:
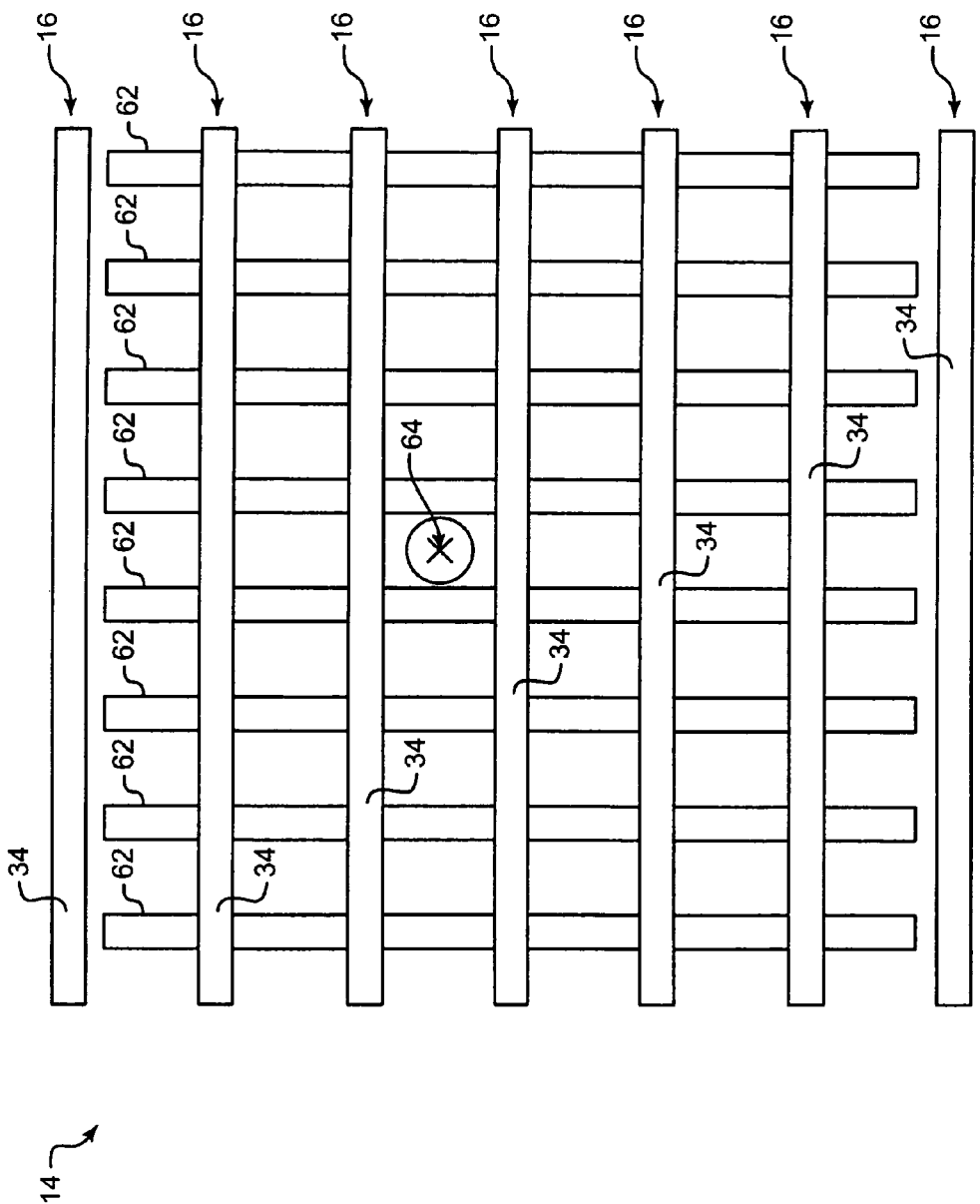
FIG. 5A is a side plan view in partial schematic form of a portion of an illustrative nuclear fission deflagration wave reactor core assembly.
Figure 5B:
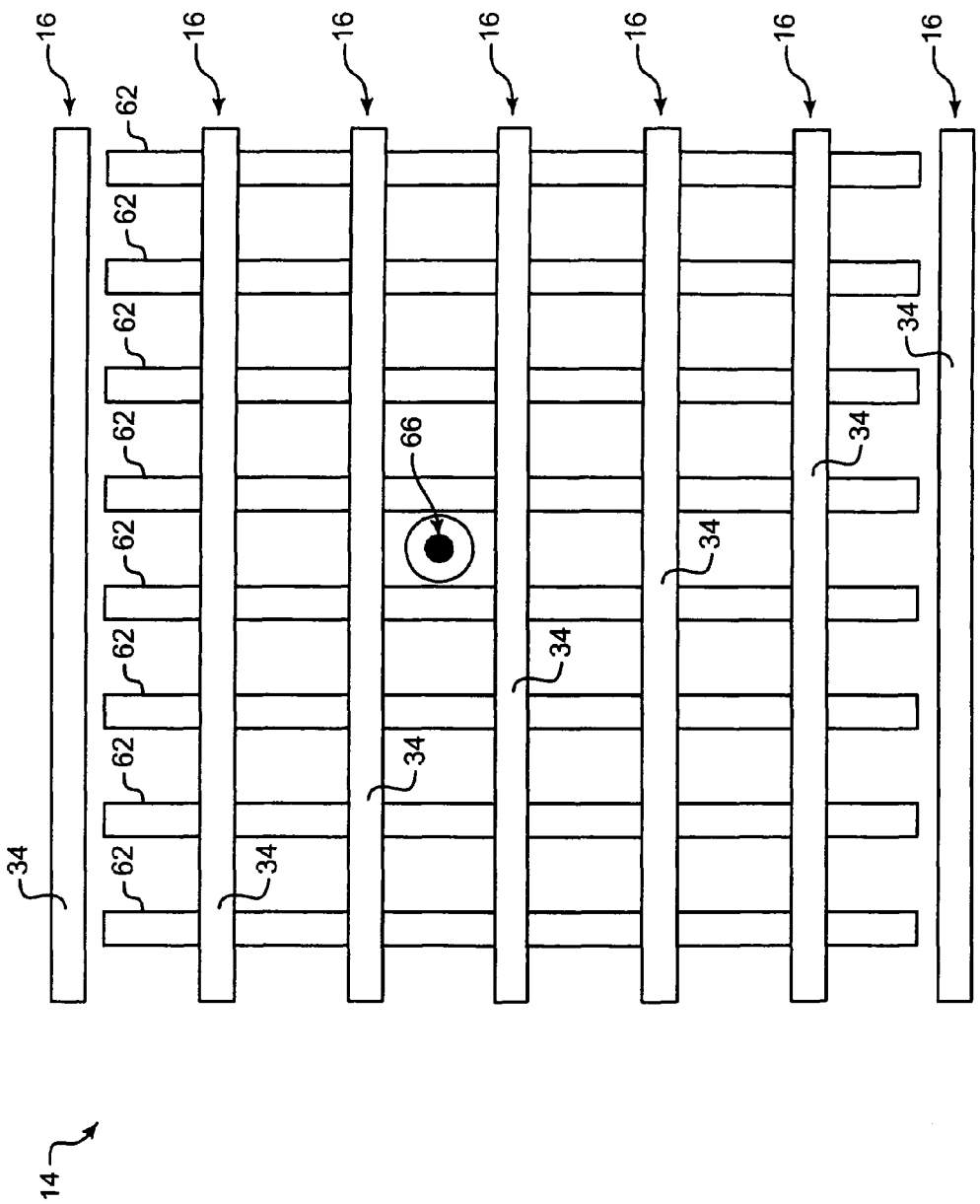
FIG. 5B is a side plan view in partial schematic form of a portion of an illustrative nuclear fission deflagration wave reactor core assembly.
Figure 5C:
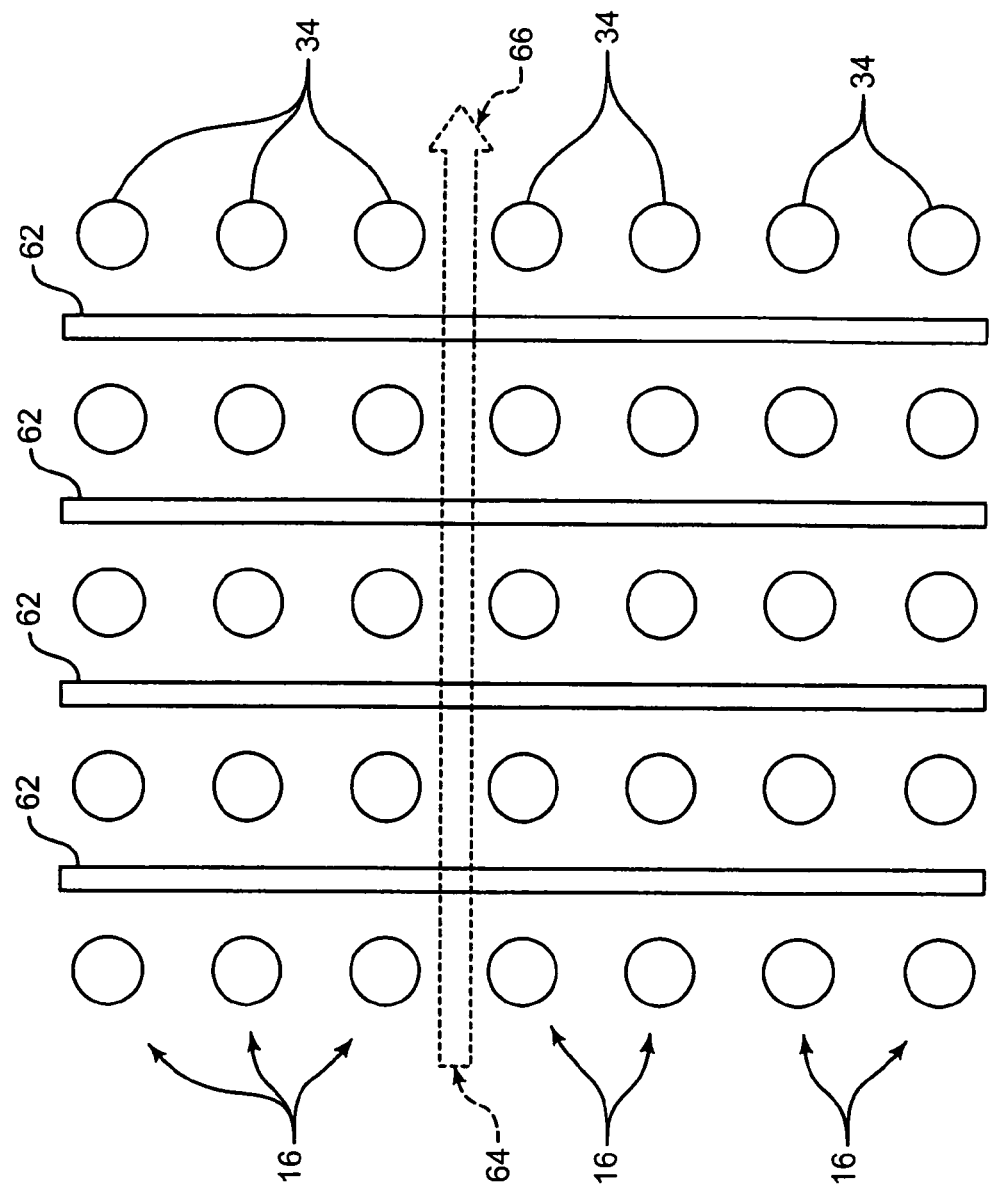
FIG. 5C is an end plan view in partial schematic form of the portion of FIGS. 5A and 5B.

In one arrangement, the primary heat pipes 16 may be disposed external of the nuclear fission fuel material. Referring now to FIGS. 5A-5C by way of non-limiting example, the nuclear fission fuel material may be disposed in nuclear fission fuel assemblies 62. The nuclear fission fuel assemblies 62 may include the nuclear fission fuel material (discussed above), cladding, structural members, and any heat transfer members as desired to facilitate heat transfer from the nuclear fission fuel material toward the primary heat pipes 16. While the nuclear fission fuel assemblies 62 are not shown in FIGS. 1A-1D and 3A-3D for purposes of clarity, in some embodiments the nuclear fission fuel assemblies 62 may be arranged in a matrix of rows and columns. In such an arrangement, the nuclear fission fuel assemblies 62 shown in FIGS. 5A and 5B represent one "slice"—that is, either one row or one column—within the reactor core assembly 14.

In such an arrangement, the evaporator section 34 of the primary heat pipes 16 can be arranged substantially perpendicular to the nuclear fission fuel assemblies 62. Thus, in such an arrangement the primary heat pipes 16 also may be arranged in a matrix of rows and columns. The primary heat pipes 16 shown in FIGS. 5A and 5B thus represent one "slice"—that is, one row or one column—within the reactor core assembly 14.

A nuclear deflagration wave can be propagated within the reactor core assembly 14 in a manner as described above. In order to help reduce fluence effects, such as without limitation swell, due to slow propagation speed and/or a fast neutron spectrum on components, such as without limitation cladding, of the nuclear fission fuel assemblies 62, it may be desirable for the nuclear fission deflagration wave to propagate perpendicular to (instead of along or parallel to) the nuclear fission fuel assemblies 62. Likewise, it may be desirable for the nuclear fission deflagration wave to propagate perpendicular to (instead of along or parallel to) the primary heat pipes 34 to help reduce any fluence effects on materials or components of the primary heat pipes 16. Thus, in some embodiments the nuclear fission deflagration wave can propagate mutually orthogonal to the nuclear fission fuel assemblies 62 and the primary heat pipes 16. Given by way of non-limiting example and as shown in FIG. 5A, the nuclear fission deflagration wave can propagate into the drawing sheet as indicated by an arrow tail 64. However, as shown in FIG. 5B the nuclear fission deflagration wave can also propagate mutually orthogonal to the nuclear fission fuel assemblies 62 and the primary heat pipes 16 by propagating out of the drawing sheet as indicated by an arrow tip 66. Both directions of the nuclear fission deflagration wave are represented in FIG. 5C.

In another illustrative arrangement, the primary heat pipes 16 again are disposed external of the nuclear fission fuel material. Referring now to FIGS. 6A-6C by way of non-limiting example, the nuclear fission fuel material may be disposed in the nuclear fission fuel assemblies 62 as described above. As described above regarding FIGS. 5A-5C, the nuclear fission fuel assemblies 62 may be arranged in a matrix of rows and columns. In such an arrangement, the nuclear fission fuel assemblies 62 shown in FIGS. 6A and 6B represent one "slice"—that is, either one row or one column as illustrated in FIG. 6C—within the reactor core assembly 14.

However, in this arrangement, the evaporator section 34 of the primary heat pipes 16 are arranged substantially parallel to the nuclear fission fuel assemblies 62. Thus, in this arrangement the primary heat pipes 16 also may be arranged in a matrix of rows and columns. The primary heat pipes 16 shown in FIGS. 6A-6C thus represent one "slice"—that is, one row or one column—within the reactor core assembly 14.

A nuclear deflagration wave can be propagated within the reactor core assembly 14 in a manner as described above. As discussed above, it may be desirable for the nuclear fission deflagration wave to propagate perpendicular to (instead of along or parallel to) the nuclear fission fuel assemblies 62 and the primary heat pipes 34. Thus, in some embodiments the nuclear fission deflagration wave can propagate perpendicular to the nuclear fission fuel assemblies 62 and the primary heat pipes 16. Given by way of non-limiting example and as shown in FIGS. 6A and 6B, the nuclear fission deflagration wave can propagate in either direction away from the arrow tail 64 toward the arrow tip 66.

Figure 6D:
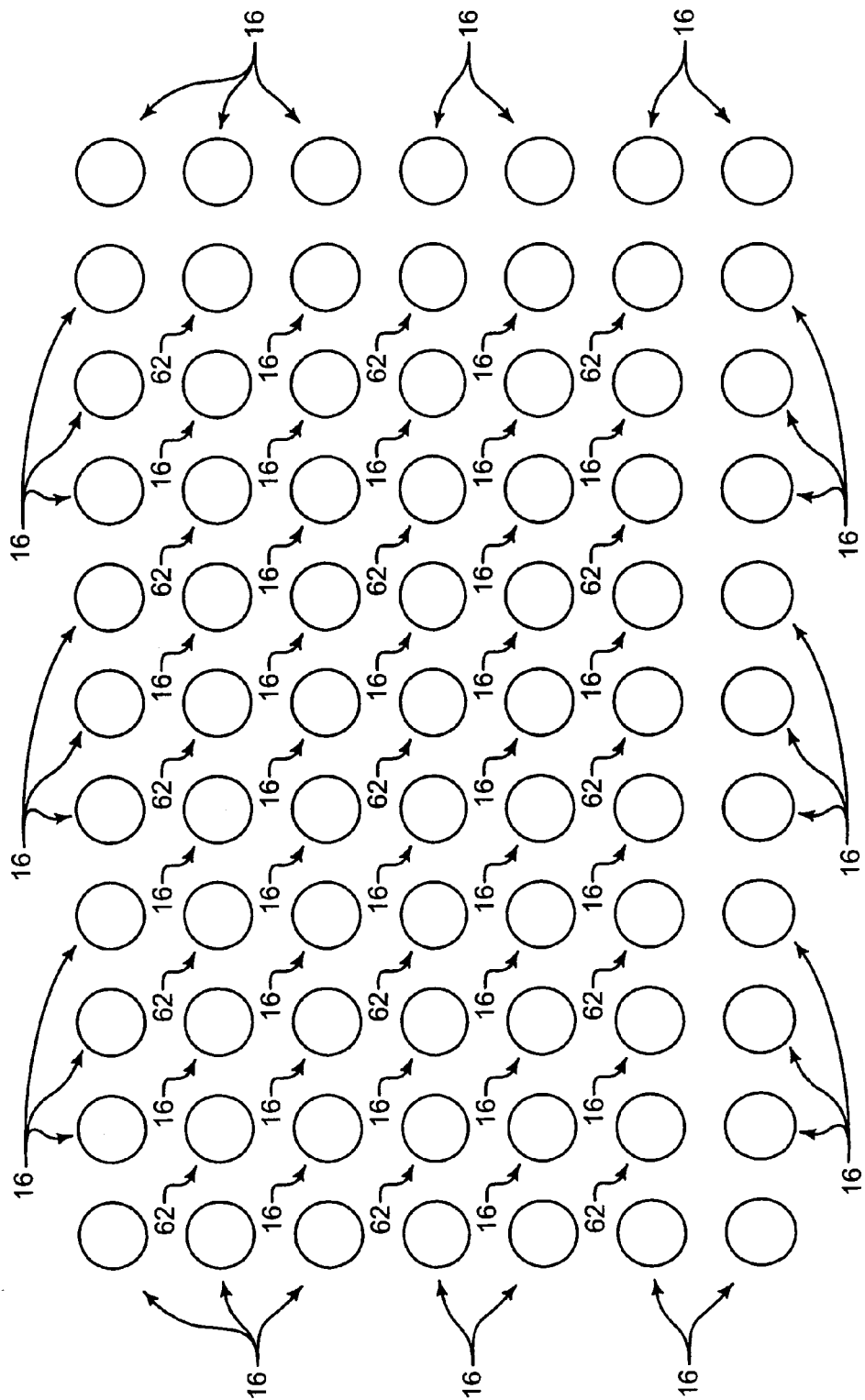
FIG. 6D is an end plan view in partial schematic form of a larger portion of the nuclear fission deflagration wave reactor core assembly of FIGS. 6A and 6B.

In some arrangements and as shown in FIG. 6D, the primary heat pipes 16 and the nuclear fission fuel assemblies 62 may be located relative to each other such that each nuclear fission fuel assembly 62 is surrounded by primary heat pipes 16. Such an arrangement can help facilitate transfer of heat from the nuclear fission fuel assemblies 62 to the primary heat pipes 16. However, it will be appreciated that the nuclear fission fuel assemblies 62 and the primary heat pipes 16 may be arranged relative to each other in any manner whatsoever as desired for a particular application.

Details will now be set forth by way of illustration for several non-limiting examples of primary heat pipes 16, secondary heat pipes 40, and internal heat pipes 54. While several illustrative examples are explained herein, the primary heat pipes 16, secondary heat pipes 40, and internal heat pipes 54 are not to be limited to the illustrative, non-limiting examples described below. Instead, it will be appreciated that any suitable heat pipe may be used as desired for a particular application.

The discussion set forth below regarding the illustrative, non-limiting examples of primary heat pipes 16, secondary heat pipes 40, and internal heat pipes 54 is adapted from U.S. patent application Ser. No. 12/152,904, entitled HEAT PIPE FISSION FUEL ELEMENT, naming CHARLES E. AHLFELD, JOHN ROGERS GILLELAND, RODERICK A. HYDE, MURIEL Y. ISHIKAWA, DAVID G. MCALEES, NATHAN P. MYHRVOLD, THOMAS ALLAN WEAVER, CHARLES WHITMER, LOWELL L. WOOD, JR., AND GEORGE B. ZIMMERMAN as inventors, filed 15 May 2008, the contents of which are hereby incorporated by reference.

Details of Illustrative Heat Pipes

Figure 7A:
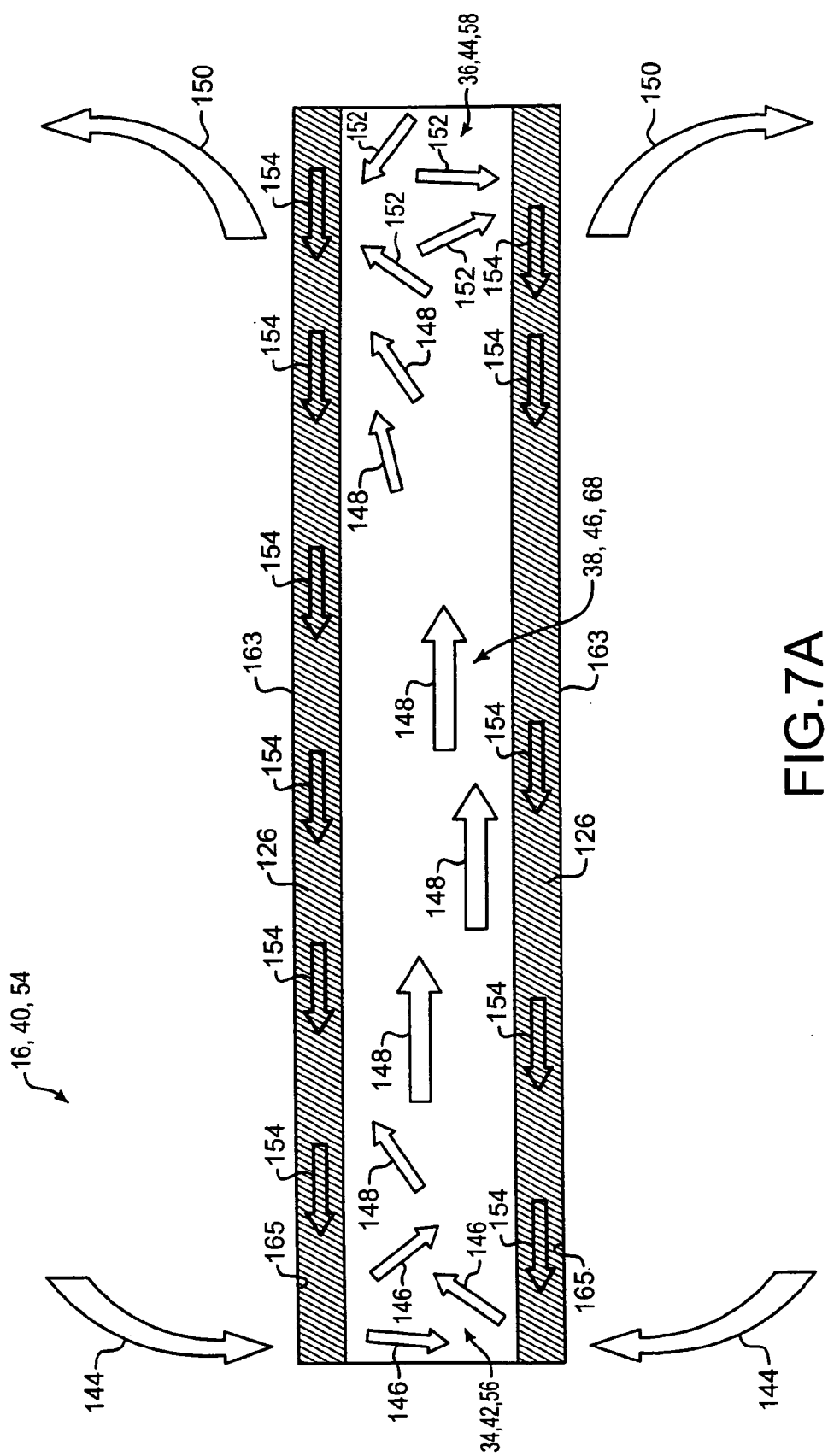
FIGS. 7A and 7B are cutaway side plan views in schematic form of illustrative heat pipes.

Referring now to FIG. 7A, an illustrative heat pipe can be disposed external of the nuclear fission fuel material. As such, the illustrative heat pipe shown in FIG. 7A may be used as any one or more of the primary heat pipes 16, the secondary heat pipes 40, and/or the internal heat pipes 54. The following discussion explains illustrative details of the non-limiting heat pipe making reference to the primary heat pipes 16, the secondary heat pipes 40, the internal heat pipes 54, and their components.

Referring still to FIG. 7A, the heat pipe 16, 40, 54 includes the evaporator section 34, 42, 56 and the condenser section 36, 44, 58. The heat pipe 16, 40, 54 may also include the adiabatic section 38, 46 and (for applications in which the illustrative heat pipe is the internal heat pipe 54) an adiabatic section 68. Heat from the nuclear fission fuel material is transferred to the evaporator section 34, 56 as indicated by arrows 144. Likewise, heat from the condenser section of the primary heat pipes 16 is transferred to the evaporator section 42 as indicated by the arrows 144.

The heat pipe 16, 40, 54 defines a cavity 166 therein. A surface 165 of a wall section 163 defines a surface of the cavity 166. The wall section 163 may be made of any suitable material as desired for high-temperature operations and/or, if desired, a neutron flux environment. Given by way of non-limiting example, in some embodiments the wall section 163 may be made of any one or more of materials such as steel, niobium, vanadium, titanium, a refractory metal, and/or a refractory alloy. Given by way of non-limiting example, in some embodiments the refractory metal may be niobium, tantalum, tungsten, hafnium, rhenium, or molybdenum. Non-limiting examples of refractory alloys include, rhenium-tantalum alloys as disclosed in U.S. Pat. No. 6,902,809, tantalum alloy T-111, molybdenum alloy TZM, tungsten alloy MT-185, or niobium alloy Nb-1Zr.

A working fluid is provided within the heat pipe 16, 40, 54. The working fluid suitably is evaporable and condensable. Given by way of non-limiting examples, the working fluid may include any suitable working fluid as desired, such as without limitation $^7$Li, sodium, potassium, or the like.

A capillary structure 126 of the heat pipe 16, 40, 54 is defined within at least a portion of the cavity 166. In some embodiments, the capillary structure 126 may be a wick. The wick may be made of any suitable material as desired, such as thorium, molybdenum, tungsten, steel, tantalum, zirconium, carbon, and a refractory metal. In some other embodiments, the capillary structure 126 may be provided as axial grooves.

The working fluid in the evaporator section 34, 42, 56 evaporates, as indicated by arrows 146, thereby undergoing phase transformation from a liquid to a gas. The working fluid in gaseous form moves through the heat pipe 16, 40, 54, as indicated by arrows 148, from the evaporator section 34, 42, 56, through the adiabatic section 38, 46, 68, and to the condenser section 36, 44, 58. At the condenser section 36, 44, 58, heat from the working fluid is transferred out of the heat pipe 16, 40, 54, as indicated by arrows 150. The working fluid in the condenser section 36, 44, 58 condenses, as indicated by arrows 152, thereby undergoing phase transformation from a gas to a liquid. The working fluid in liquid form returns from the condenser section 36, 44, 58 through the adiabatic section 38, 46, 68 to the evaporator section 34, 42, 56, as indicated by arrows 154, via capillary action in the capillary structure 126.

Figure 7B:
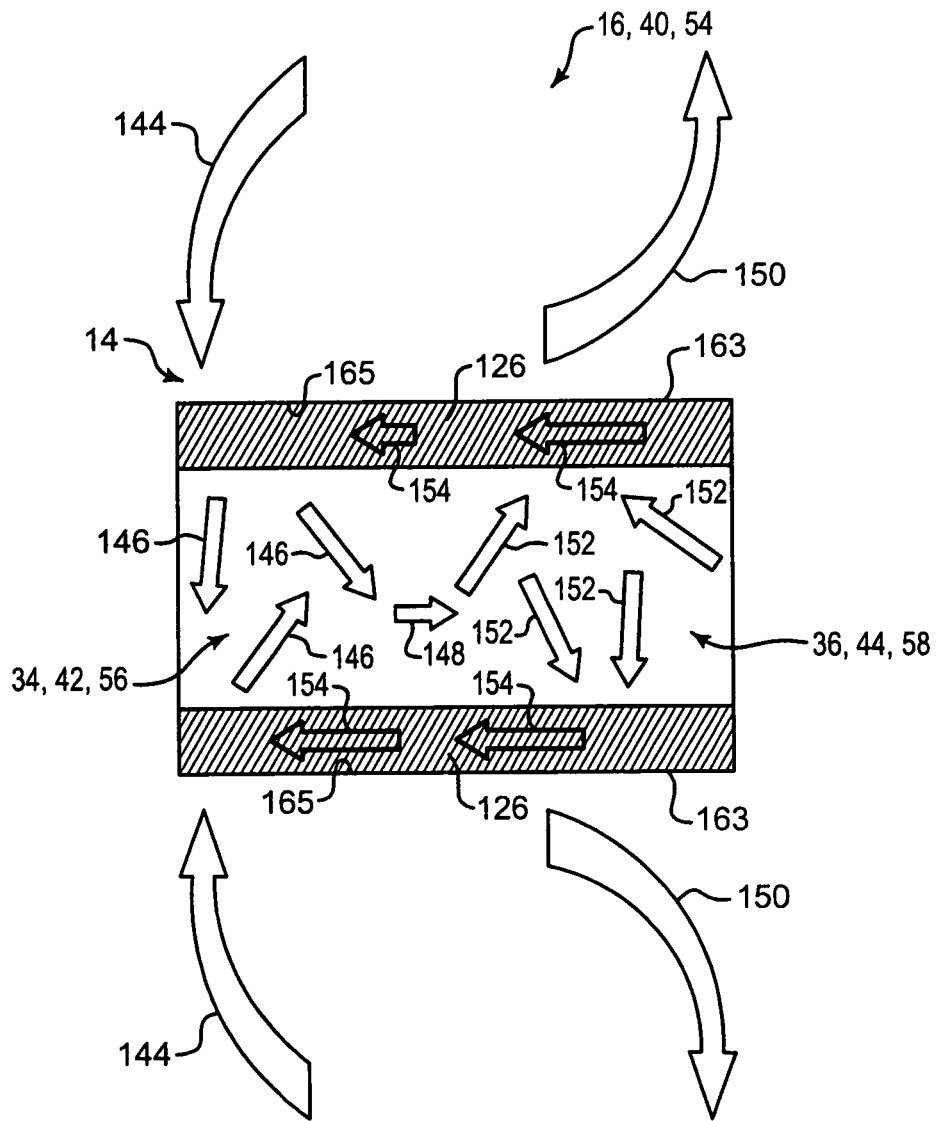

Referring now to FIG. 7B, in some other embodiments an illustrative heat pipe is similar to that shown in FIG. 7A and described above. However, the heat pipe shown in FIG. 7B does not include an adiabatic section. All other features are similar to those shown in FIG. 7A. To that end, the working fluid in the evaporator section 34, 42, 56 evaporates, as indicated by the arrows 146, thereby undergoing phase transformation from a liquid to a gas. The working fluid in gaseous form moves through the heat pipe 16, 40, 54, as indicated by the arrow 148, from the evaporator section 34, 42, 56 to the condenser section 36, 44, 58. At the condenser section 36, 44, 58, heat from the working fluid is transferred out of the heat pipe 16, 40, 54, as indicated by the arrows 150. The working fluid in the condenser section 36, 44, 58 condenses, as indicated by the arrows 152, thereby undergoing phase transformation from a gas to a liquid. The working fluid in liquid form returns from the condenser section 36, 44, 58 to the evaporator section 34, 42, 56, as indicated by the arrows 154, via capillary action in the capillary structure 126.

It will be appreciated that the illustrative heat pipe shown in FIG. 7B can be used as the primary heat pipe 16 or the secondary heat pipe 40, as desired for a particular application. However, it may be desirable to use the illustrative heat pipe shown in FIG. 7B as the internal heat pipe 54 if size constraints are a consideration.

Figure 8A:
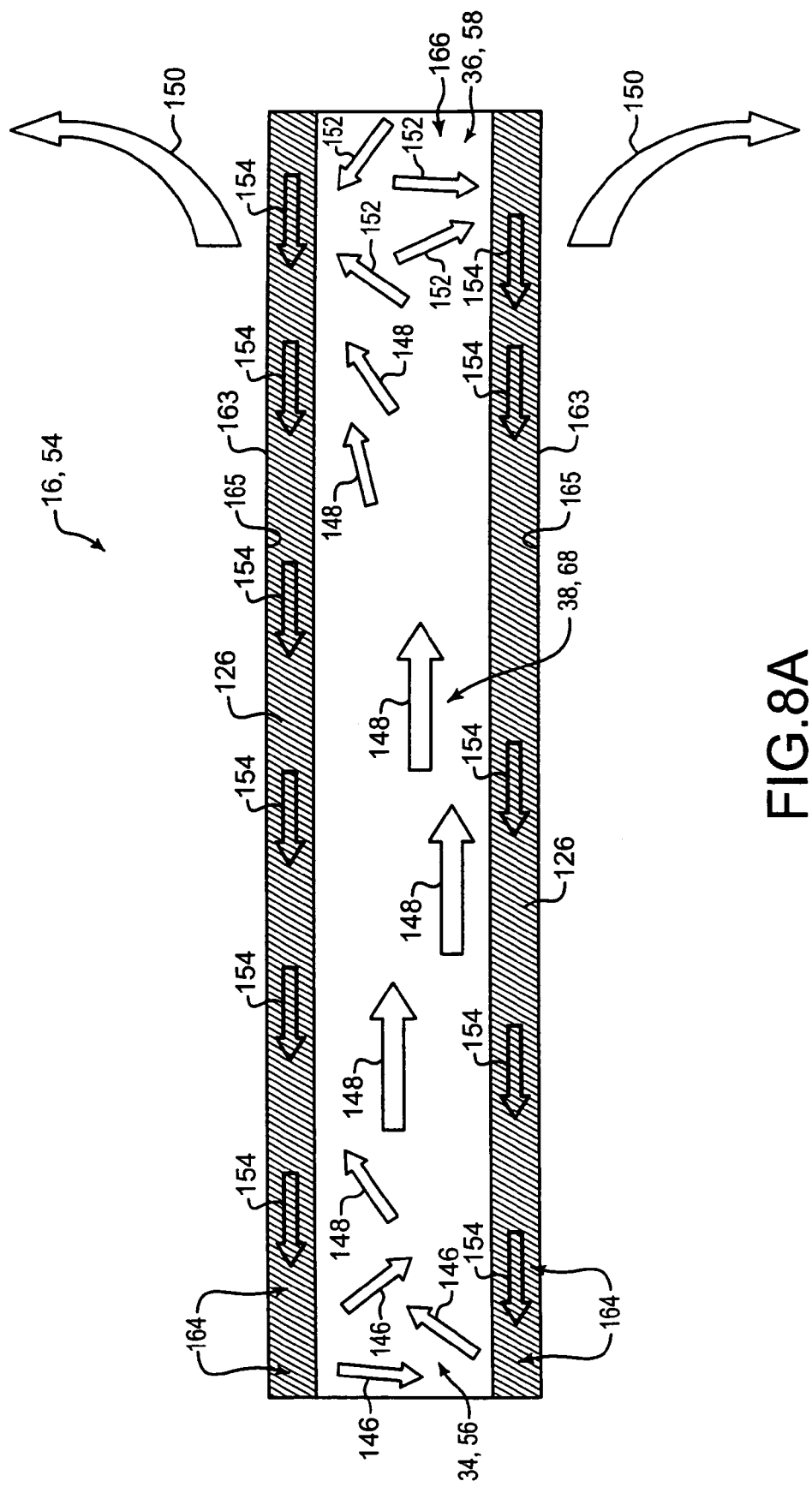
FIGS. 8A and 8B are cutaway side plan views in schematic form of other illustrative heat pipes.

Referring now to FIG. 8A, in some other embodiments nuclear fission fuel material 164 may be disposed in at least a portion of a heat pipe. Because the nuclear fission fuel material 164 is disposed in a portion therein, the illustrative heat pipe shown in FIG. 8A may be used as the primary heat pipe 16 or the internal heat pipe 54.

The heat pipe 16, 54 defines a cavity 166 therein. The surface 165 of the wall section 163 defines a surface of the cavity 166. In some embodiments, the nuclear fission fuel material 164 is disposed within at least a portion of the cavity 166. For example, in some embodiments the nuclear fission fuel material 164 may be disposed within the capillary structure 126. However, it will be appreciated that the nuclear fission fuel material 164 need not be disposed within the capillary structure 126 and may be disposed anywhere whatsoever within the cavity 166 as desired.

In some embodiments, given by way of non-limiting example the nuclear fission fuel material 164 may have a capillary structure. If desired, in some other embodiments the nuclear fission fuel material 164 may have a sintered powdered fuel microstructure, or a foam microstructure, or a high density microstructure, or the like.

In some other embodiments a portion of the wall section 163 can include the nuclear fission fuel material 164. In such arrangements the nuclear fission fuel material 164 can be disposed outside of the cavity 166.

With the exception of addition of the nuclear fission fuel material 164, other features shown in FIG. 8A are similar to those shown in FIG. 7A. To that end, the working fluid in the evaporator section 34, 56 evaporates, as indicated by the arrows 146, thereby undergoing phase transformation from a liquid to a gas. The working fluid in gaseous form moves through the heat pipe 16, 54, as indicated by the arrows 148, from the evaporator section 34, 56, through the adiabatic section 38, 68, and to the condenser section 36, 58. At the condenser section 36, 58, heat from the working fluid is transferred out of the heat pipe 16, 54, as indicated by the arrows 150. The working fluid in the condenser section 36, 58 condenses, as indicated by the arrows 152, thereby undergoing phase transformation from a gas to a liquid. The working fluid in liquid form returns from the condenser section 36, 58 through the adiabatic section 38, 68 to the evaporator section 34, 56, as indicated by the arrows 154, via capillary action in the capillary structure 126.

Figure 8B:
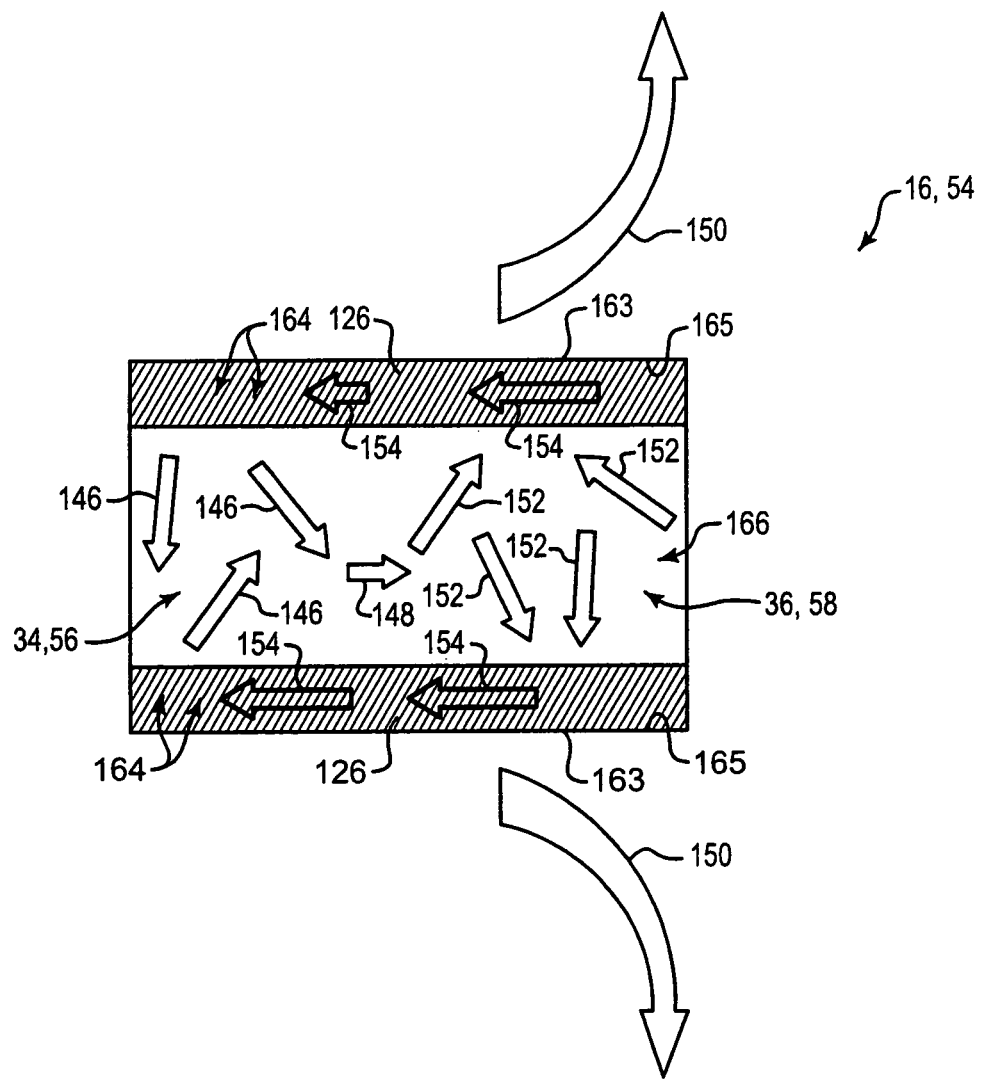

Referring now to FIG. 8B, in some other embodiments an illustrative heat pipe is similar to that shown in FIG. 8A and described above. However, the heat pipe shown in FIG. 8B does not include an adiabatic section. All other features are similar to those shown in FIG. 8A. To that end, the working fluid in the evaporator section 34, 56 evaporates, as indicated by the arrows 146, thereby undergoing phase transformation from a liquid to a gas. The working fluid in gaseous form moves through the heat pipe 16, 54, as indicated by the arrow 148, from the evaporator section 34, 56 to the condenser section 36, 58. At the condenser section 36, 58, heat from the working fluid is transferred out of the heat pipe 16, 54, as indicated by the arrows 150. The working fluid in the condenser section 36, 58 condenses, as indicated by the arrows 152, thereby undergoing phase transformation from a gas to a liquid. The working fluid in liquid form returns from the condenser section 36, 58 to the evaporator section 34, 56, as indicated by the arrows 154, via capillary action in the capillary structure 126.

It will be appreciated that the illustrative heat pipe shown in FIG. 8B can be used as the primary heat pipe 16 as desired for a particular application. However, it may be desirable to use the illustrative heat pipe shown in FIG. 8B as the internal heat pipe 54 if size constraints are a consideration.

Figure 9A:
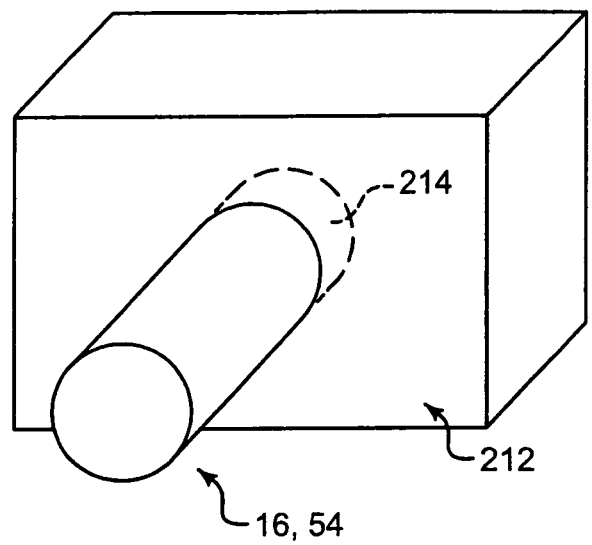
FIG. 9A is a perspective view in schematic form of illustrative nuclear fission fuel material.
Figure 9B:
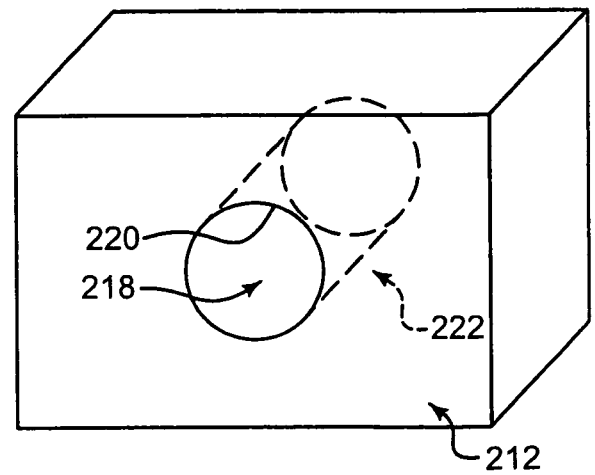
FIG. 9B is a perspective view in schematic form of details of the nuclear fission fuel material of FIG. 9A.

Referring now to FIGS. 9A and 9B, in some other embodiments at least a portion 214 (shown in phantom) of an illustrative heat pipe may be disposed in a portion of nuclear fission fuel material 212. Because at least the portion 214 of the heat pipe is disposed in a portion of the nuclear fission fuel material 212, the illustrative heat pipe shown in FIG. 9A may be used as the primary heat pipe 16 or the internal heat pipe 54.

At least the portion 214 of the heat pipe 16, 54 may be defined by a cavity 218 that may be defined in the nuclear fission fuel material 212. In some embodiments, the cavity 218 may be a passageway that is defined through at least the portion 214 of the nuclear fission fuel material 212. Thus, in some embodiments, a surface 220 of the cavity 218 may be a wall of the portion 214 of the heat pipe 16, 54. The cavity 218 may be defined in any suitable manner. For example, in some embodiments the cavity 218 may be defined by machining the cavity from the nuclear fission fuel material 212 in any manner as desired, such as by drilling, milling, stamping, or the like. In some other embodiments the cavity 218 may be defined by forming at least a portion 222 of the nuclear fission fuel material 212 around a shape, such as without limitation a mandrel (not shown). The forming may be performed in any manner as desired, such as without limitation by welding, casting, electroplating, pressing, molding, or the like.

Figure 10A:
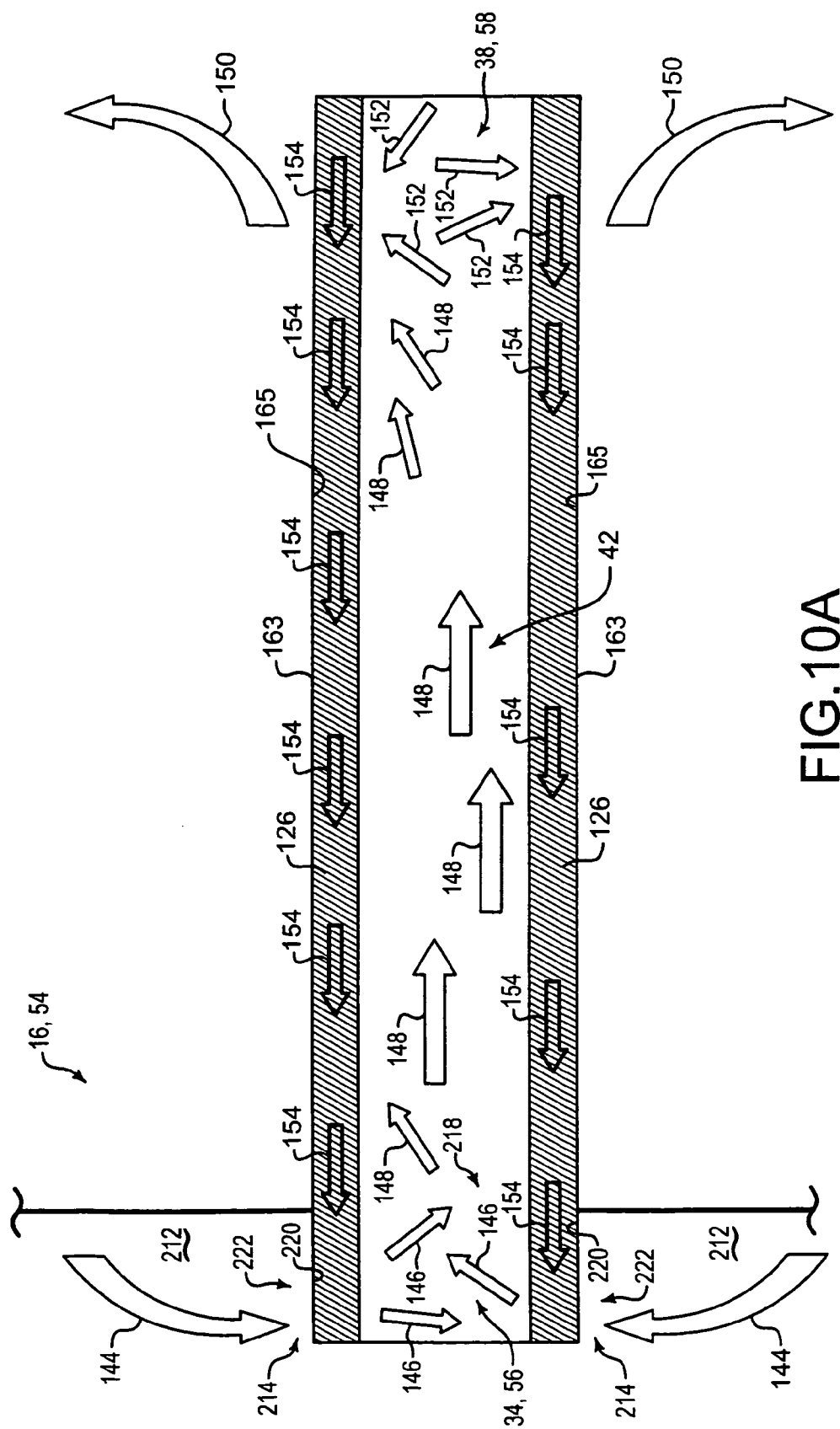
FIGS. 10A and 10B are cutaway side plan views in schematic form of illustrative heat pipes for use with the nuclear fission fuel material of FIGS. 9A and 9B.

Referring additionally to FIG. 10A, the surface 165 of the wall section 163 of the heat pipe 16, 54 extends from the cavity 218 in the nuclear fission fuel material 212, thereby substantially acting as an extension of the surface 220. As such, the cavity 218 can be considered to be substantially sealed.

The capillary structure 126 of the heat pipe 16, 54 is defined within at least a portion of the cavity 218. That is, the surface 220 is a wall that surrounds a portion of the capillary structure 126. In some embodiments, the capillary structure 126 may also be defined in an interior of the heat pipe 16, 54 that is outside the nuclear fission fuel material 212 and enclosed by the wall section 163. In some embodiments, the capillary structure 126 may be a wick. The wick may be made of any suitable material as desired, such as thorium, molybdenum, tungsten, steel, tantalum, zirconium, carbon, and a refractory metal. In some other embodiments, the capillary structure 126 may be provided as axial grooves.

A working fluid is provided within the heat pipe 16, 54. The working fluid suitably is evaporable and condensable. Given by way of non-limiting examples, the working fluid may include any suitable working fluid as desired, such as without limitation $^7$Li, sodium, potassium, or the like.

Heat from the nuclear fission fuel material 212 is transferred to the evaporator section 34, 56 as indicated by the arrows 144. The working fluid in the evaporator section 34, 56 evaporates, as indicated by the arrows 146, thereby undergoing phase transformation from a liquid to a gas. The working fluid in gaseous form moves through the heat pipe 16, 54, as indicated by the arrows 148, from the evaporator section 34, 56, through the adiabatic section 38, 68, and to the condenser section 36, 58. At the condenser section 36, 58, heat from the working fluid is transferred out of the heat pipe 16, 54, as indicated by the arrows 150. The working fluid in the condenser section 36, 58 condenses, as indicated by the arrows 152, thereby undergoing phase transformation from a gas to a liquid. The working fluid in liquid form returns from the condenser section 36, 58 through the adiabatic section 38, 68 to the evaporator section 34, 56, as indicated by the arrows 154, via capillary action in the capillary structure 126.

Figure 10B:
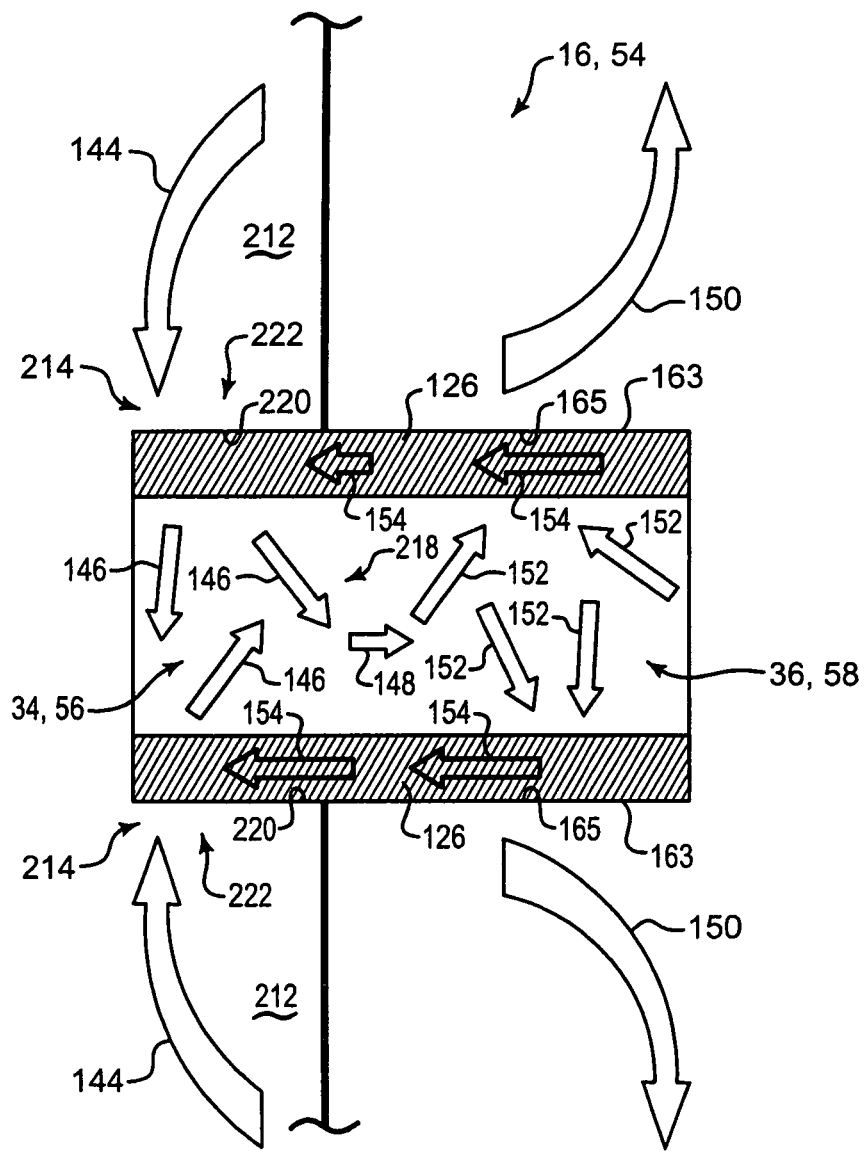

Referring now to FIG. 10B, in some other embodiments an illustrative heat pipe is similar to that shown in FIG. 10A and described above. However, the heat pipe shown in FIG. 10B does not include an adiabatic section. All other features are similar to those shown in FIG. 10A. To that end, heat from the nuclear fission fuel material 212 is transferred to the evaporator section 34, 56 as indicated by the arrows 144. The working fluid in the evaporator section 34, 56 evaporates, as indicated by the arrows 146, thereby undergoing phase transformation from a liquid to a gas. The working fluid in gaseous form moves through the heat pipe 16, 54, as indicated by the arrow 148, from the evaporator section 34, 56 to the condenser section 36, 58. At the condenser section 36, 58, heat from the working fluid is transferred out of the heat pipe 16, 54, as indicated by the arrows 150. The working fluid in the condenser section 36, 58 condenses, as indicated by the arrows 152, thereby undergoing phase transformation from a gas to a liquid. The working fluid in liquid form returns from the condenser section 36, 58 to the evaporator section 34, 56, as indicated by the arrows 154, via capillary action in the capillary structure 126.

It will be appreciated that the illustrative heat pipe shown in FIG. 10B can be used as the primary heat pipe 16 as desired for a particular application. However, it may be desirable to use the illustrative heat pipe shown in FIG. 10B as the internal heat pipe 54 if size constraints are a consideration.

Illustrative Methods

Now that illustrative embodiments of nuclear fission deflagration wave reactors and illustrative, non-limiting heat pipes for use therewith have been discussed, illustrative methods associated therewith will now be discussed.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular design paradigms.

Figure 11A:
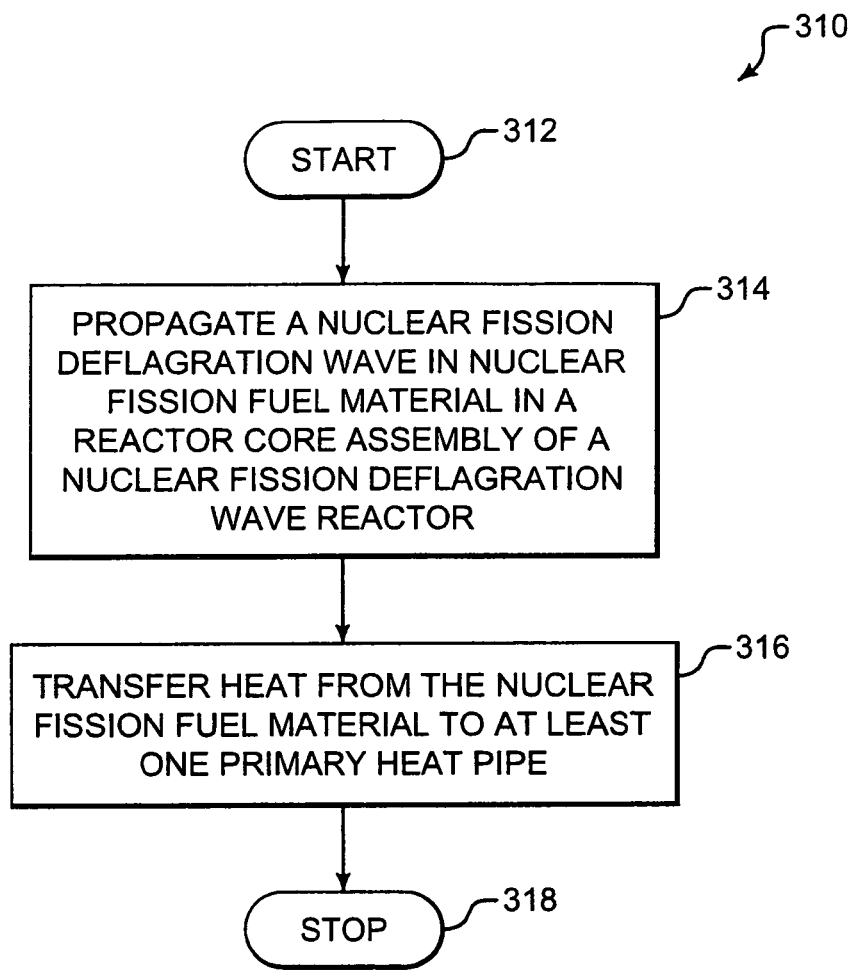
FIG. 11A is a flowchart of an illustrative method of transferring heat of a nuclear fission deflagration wave reactor.

Referring now to FIG. 11A, an illustrative method 310 is provided for transferring heat of a nuclear fission deflagration wave reactor. The method 310 starts at a block 312. At a block 314 a nuclear fission deflagration wave is propagated in nuclear fission fuel material in a reactor core assembly of a nuclear fission deflagration wave reactor. At a block 316 heat from the nuclear fission fuel material is transferred to at least one primary heat pipe. Given by way of illustration and not of limitation, the heat can be transferred from a portion of the nuclear fission fuel material that is proximate a burnfront of the nuclear fission deflagration wave. The method 310 stops at a block 318.

Figure 11B:
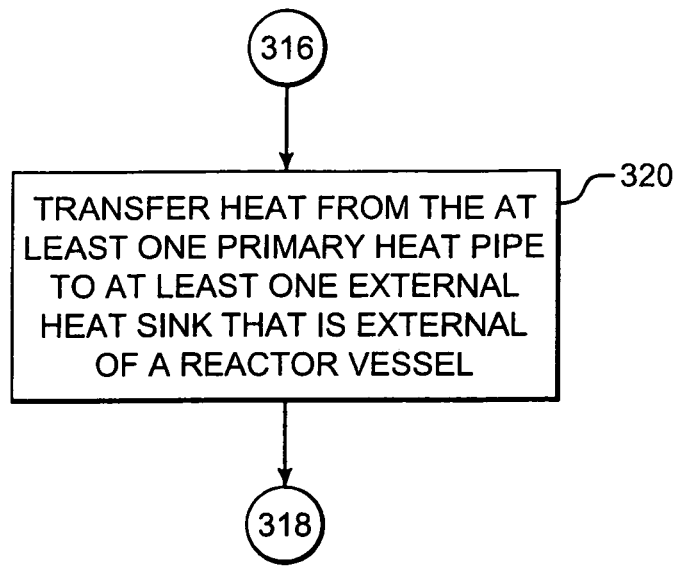
FIGS. 11B through 11D are flowcharts of details of the method of FIG. 11A.

Referring now to FIG. 11B, at a block 320 heat can be transferred from the at least one primary heat pipe to at least one external heat sink that is external of a reactor vessel.

Figure 11C:
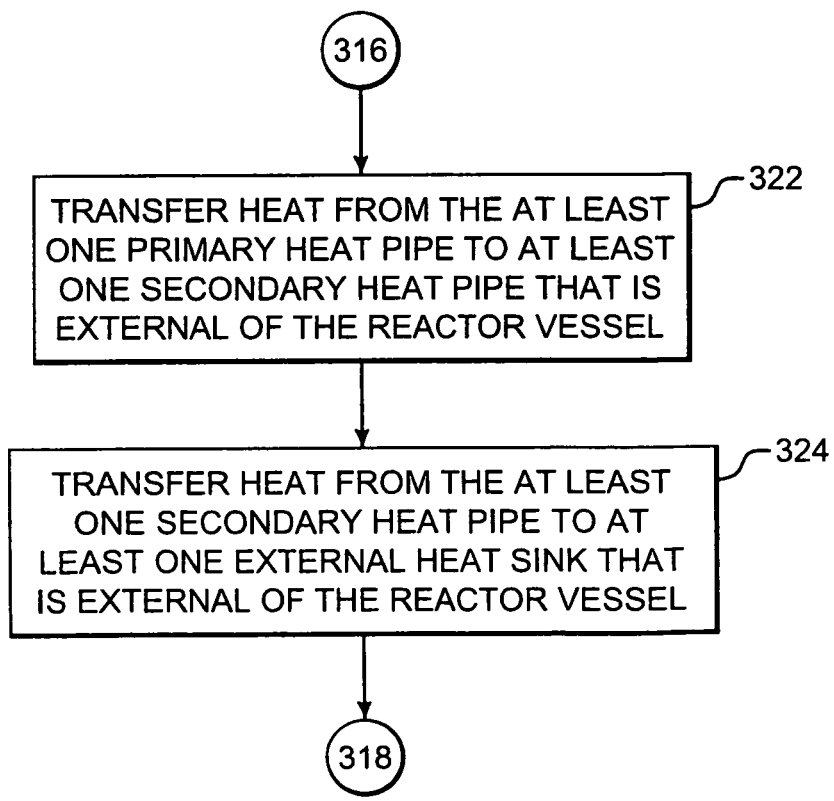

Referring now to FIG. 11C, at a block 322 heat can be transferred from the at least one primary heat pipe to at least one secondary heat pipe that is external of a reactor vessel. At a block 324 heat can be transferred from the at least one secondary heat pipe to at least one external heat sink that is external of the reactor vessel.

Figure 11D:
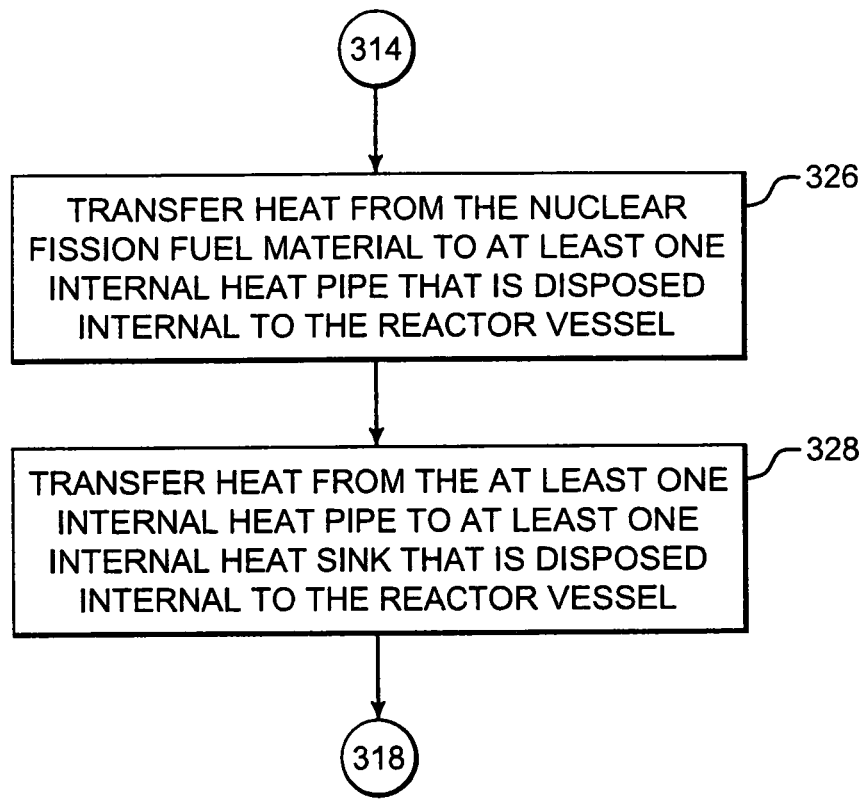

Referring now to FIG. 11D, at a block 326 heat can be transferred from the nuclear fission fuel material to at least one internal heat pipe that is disposed internal to a reactor vessel. At a block 328 heat can be transferred from the at least one internal heat pipe to at least one internal heat sink that is disposed internal to the reactor vessel.

Figure 12A:
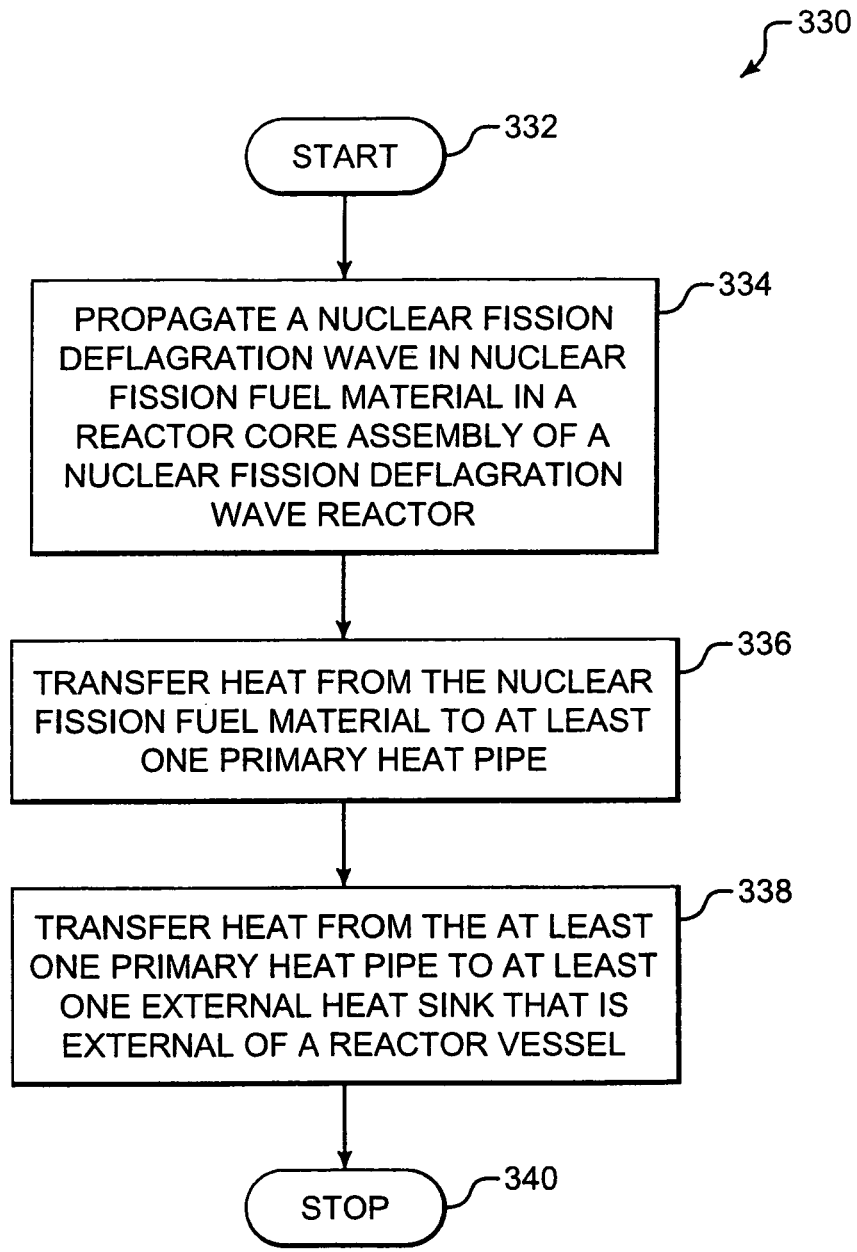
FIG. 12A is a flowchart of an illustrative method of transferring heat from a nuclear fission deflagration wave reactor.

Referring now to FIG. 12A, an illustrative method 330 is provided for transferring heat from a nuclear fission deflagration wave reactor. The method 330 starts at a block 332. At a block 334 a nuclear fission deflagration wave is propagated in nuclear fission fuel material in a reactor core assembly of a nuclear fission deflagration wave reactor. At a block 336 heat is transferred from the nuclear fission fuel material to at least one primary heat pipe. Given by way of illustration and not of limitation, the heat can be transferred from a portion of the nuclear fission fuel material that is proximate a burnfront of the nuclear fission deflagration wave. At a block 338 heat is transferred from the at least one primary heat pipe to at least one external heat sink that is external of a reactor vessel. The method 330 stops at a block 340.

Figure 12B:
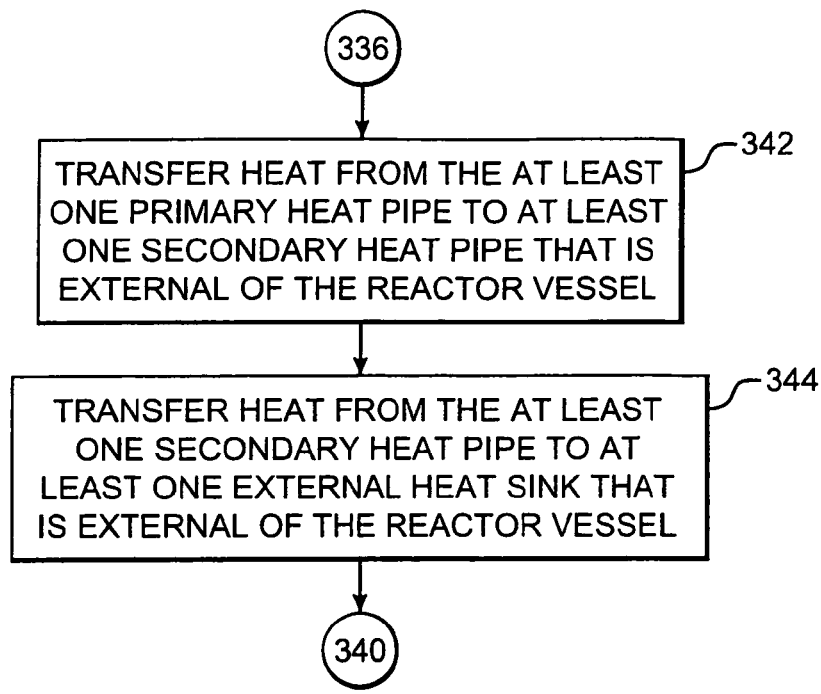
FIGS. 12B and 12C are flowcharts of details of the method of FIG. 12A.

Referring now to FIG. 12B, at a block 342 heat can be transferred from the at least one primary heat pipe to at least one secondary heat pipe that is external of a reactor vessel. At a block 344 heat is transferred from the at least one secondary heat pipe to at least one external heat sink that is external of the reactor vessel.

Figure 12C:
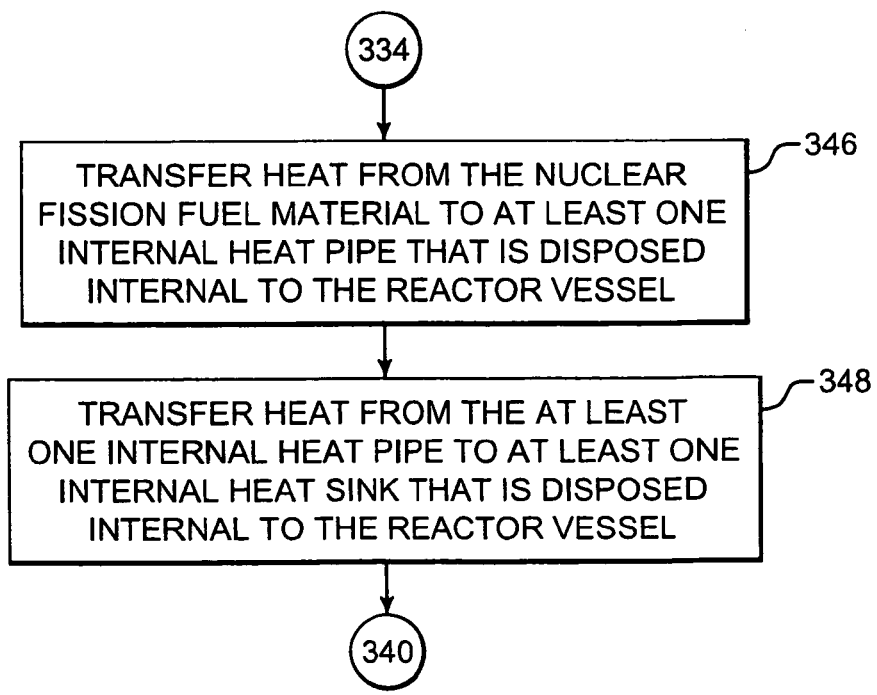

Referring now to FIG. 12C, at a block 346 heat can be transferred from the nuclear fission fuel material to at least one internal heat pipe that is disposed internal to a reactor vessel. At a block 348 heat is transferred from the at least one internal heat pipe to at least one internal heat sink that is disposed internal to the reactor vessel.

Figure 13A:
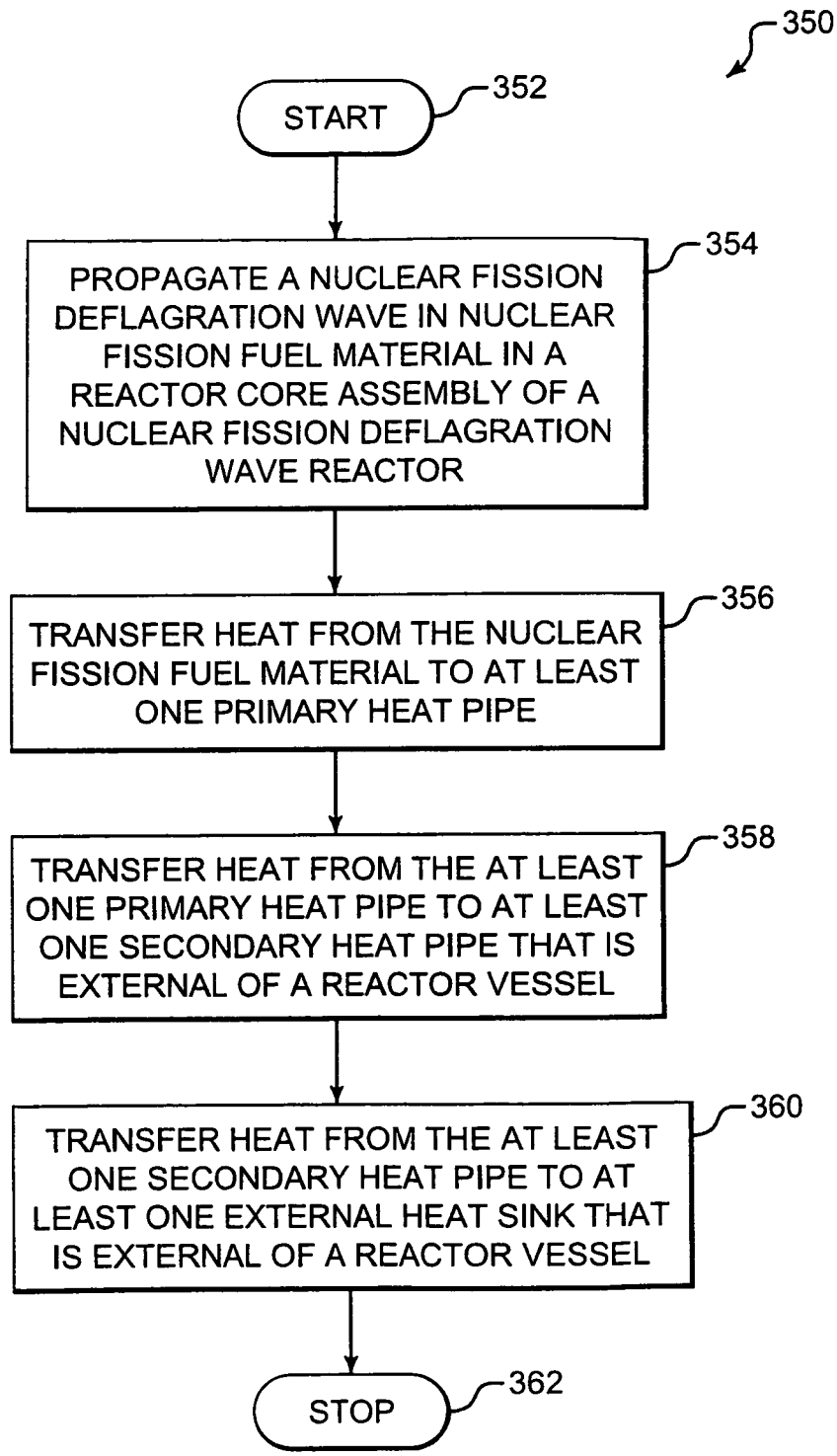
FIG. 13A is a flowchart of another illustrative method of transferring heat from a nuclear fission deflagration wave reactor.

Referring now to FIG. 13A, an illustrative method 350 is provided for transferring heat from a nuclear fission deflagration wave reactor. The method 350 starts at a block 352. At a block 354 a nuclear fission deflagration wave is propagated in nuclear fission fuel material in a reactor core assembly of a nuclear fission deflagration wave reactor. At a block 356 heat is transferred from the nuclear fission fuel material to at least one primary heat pipe. Given by way of illustration and not of limitation, the heat can be transferred from a portion of the nuclear fission fuel material that is proximate a burnfront of the nuclear fission deflagration wave. At a block 358 heat is transferred from the at least one primary heat pipe to at least one secondary heat pipe that is external of a reactor vessel. At a block 360 heat is transferred from the at least one secondary heat pipe to at least one external heat sink that is external of the reactor vessel. The method 350 stops at a block 362.

Figure 13B:
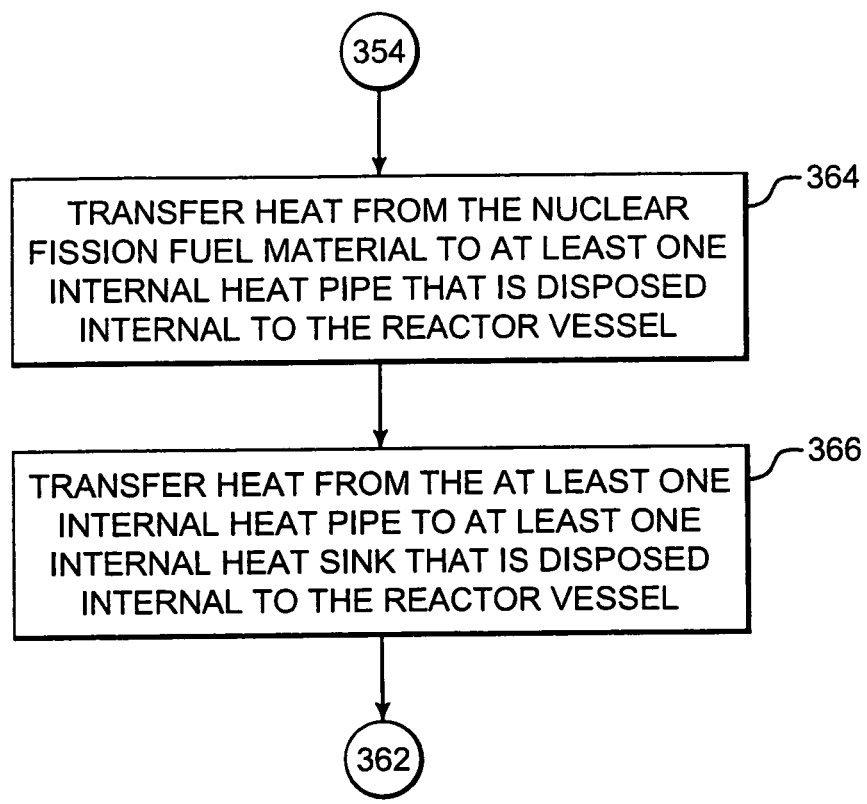
FIG. 13B is a flowchart of details of the method of FIG. 13A.

Referring now to FIG. 13B, at a block 364 heat can be transferred from the nuclear fission fuel material to at least one internal heat pipe that is disposed internal to a reactor vessel. At a block 366 heat is transferred from the at least one internal heat pipe to at least one internal heat sink that is disposed internal to the reactor vessel.

Figure 14:
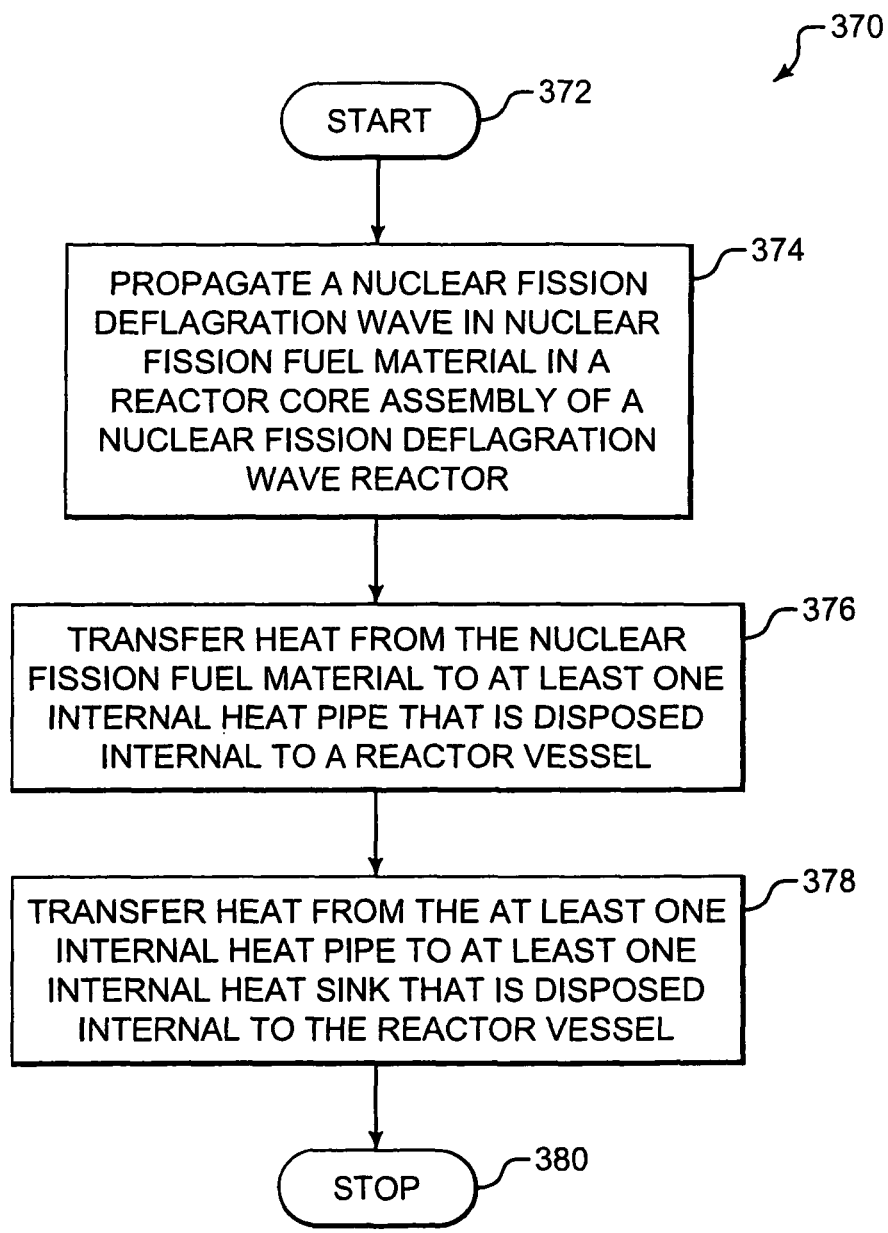
FIG. 14 is a flowchart of an illustrative method of transferring heat within a nuclear fission deflagration wave reactor.

Referring now to FIG. 14, an illustrative method 370 is provided for transferring heat within a nuclear fission deflagration wave reactor. The method 370 begins at a block 372. At a block 374 a nuclear fission deflagration wave is propagated in nuclear fission fuel material in a reactor core assembly of a nuclear fission deflagration wave reactor. At a block 376 heat is transferred from the nuclear fission fuel material to at least one internal heat pipe that is disposed internal to a reactor vessel. Given by way of illustration and not of limitation, the heat can be transferred from a portion of the nuclear fission fuel material that is proximate a burnfront of the nuclear fission deflagration wave. At a block 378 heat is transferred from the at least one internal heat pipe to at least one internal heat sink that is disposed internal to the reactor vessel. The method 370 stops at a block 380.

One skilled in the art will recognize that the herein described components (e.g., blocks), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., blocks), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of transferring heat of a nuclear fission deflagration wave reactor, the method comprising:
    disposing nuclear fission fuel material in at least a portion of at least one primary heat pipe;
    propagating a nuclear fission deflagration wave in the nuclear fission fuel material in a reactor core assembly of a nuclear fission deflagration wave reactor; and
    during propagating the nuclear fission deflagration wave, transferring heat from the propagating nuclear fission deflagration wave to the at least one primary heat pipe.

2. The method of claim 1, further comprising:
    transferring heat from the at least one primary heat pipe to at least one secondary heat pipe that is external of a reactor vessel; and
    transferring heat from the at least one secondary heat pipe to at least one external heat sink that is external of the reactor vessel.

3. The method of claim 1, further comprising:
    transferring heat from the nuclear fission fuel material to at least one internal heat pipe that is disposed internal to a reactor vessel; and
    transferring heat from the at least one internal heat pipe to at least one internal heat sink that is disposed internal to the reactor vessel.

4. The method of claim 1, wherein heat is transferred from a portion of the nuclear fission fuel material proximate a burnfront of the nuclear fission deflagration wave.

5. A method of transferring heat from a nuclear fission deflagration wave reactor, the method comprising:
    disposing nuclear fission fuel material in at least a portion of at least one primary heat pipe;
    propagating a nuclear fission deflagration wave in the nuclear fission fuel material in a reactor core assembly of a nuclear fission deflagration wave reactor;
    during propagating the nuclear fission deflagration wave, transferring heat from the propagating nuclear fission deflagration wave to the at least one primary heat pipe; and
    transferring heat from the at least one primary heat pipe to at least one external heat sink that is external of a reactor vessel.

6. The method of claim 5, further comprising:
    transferring heat from the at least one primary heat pipe to at least one secondary heat pipe that is external of a reactor vessel; and
    transferring heat from the at least one secondary heat pipe to at least one external heat sink that is external of the reactor vessel.

7. The method of claim 5, further comprising:
    transferring heat from the nuclear fission fuel material to at least one internal heat pipe that is disposed internal to a reactor vessel; and
    transferring heat from the at least one internal heat pipe to at least one internal heat sink that is disposed internal to the reactor vessel.

8. The method of claim 5, wherein heat is transferred from a portion of the nuclear fission fuel material proximate a burnfront of the nuclear fission deflagration wave.

9. The method of claim 1, further comprising disposing the at least one primary heat pipe in the reactor vessel.

10. The method of claim 1, further comprising disposing a second at least one primary heat pipe in the reactor vessel and external to the nuclear fission fuel material, and wherein transferring heat from the propagating nuclear fission deflagration wave to the at least one primary heat pipe includes transferring heat from the propagating nuclear fission deflagration wave to the second at least one primary heat pipe.

11. The method of claim 1, further comprising disposing a second at least one primary heat pipe substantially orthogonal to a fuel assembly containing at least a portion of the nuclear fission fuel, and wherein transferring heat from the propagating nuclear fission deflagration wave to the at least one primary heat pipe includes transferring heat from the propagating nuclear fission deflagration wave to the second at least one primary heat pipe.

* * * * *